(12) United States Patent
Sato et al.

(10) Patent No.: US 12,049,993 B2
(45) Date of Patent: Jul. 30, 2024

(54) VEHICLE LAMP

(71) Applicant: Ichikoh Industries, Ltd., Isehara (JP)

(72) Inventors: Yoshiro Sato, Isehara (JP); Daisuke Takamura, Isehara (JP); Takaaki Tsuchiya, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/995,042

(22) PCT Filed: Mar. 30, 2021

(86) PCT No.: PCT/JP2021/013577
§ 371 (c)(1),
(2) Date: Sep. 29, 2022

(87) PCT Pub. No.: WO2021/200972
PCT Pub. Date: Oct. 7, 2021

(65) Prior Publication Data
US 2023/0125470 A1    Apr. 27, 2023

(30) Foreign Application Priority Data

Mar. 31, 2020  (JP) .................................. 2020-064053

(51) Int. Cl.
*F21S 43/16*    (2018.01)
*F21S 43/20*    (2018.01)
*F21S 43/31*    (2018.01)

(52) U.S. Cl.
CPC ............... *F21S 43/16* (2018.01); *F21S 43/26* (2018.01); *F21S 43/31* (2018.01)

(58) Field of Classification Search
CPC ............. F21S 43/26; F21S 43/31; F21S 43/16
See application file for complete search history.

(56) References Cited

U.S. PATENT DOCUMENTS

| 7,498,734 B2 * | 3/2009 | Suehiro | ................ H01L 33/507 313/506 |
| 7,837,348 B2 * | 11/2010 | Narendran | ............. F21V 5/004 362/558 |

(Continued)

FOREIGN PATENT DOCUMENTS

| DE | 10 2010 030 660 A1 | 12/2011 |
| DE | 10 2013 205 836 A1 | 10/2014 |

(Continued)

OTHER PUBLICATIONS

International Search Report issued Jun. 1, 2021 in PCT/JP2021/013577 filed on Mar. 30, 2021, 3 pages.

(Continued)

Primary Examiner — Arman B Fallahkhair
(74) Attorney, Agent, or Firm — Oblon, McClelland, Maier & Neustadt, L.L.P.

(57) ABSTRACT

Photoluminescence generated by excitation light emitted from an excitation light source can be effectively utilized. A vehicle lamp according to the present invention includes a lamp housing and a lamp lens forming a lamp chamber, an excitation light source disposed in the lamp chamber and emitting excitation light, and a luminescence unit fixed to the lamp lens on a side thereof closer to the lamp chamber and generating photoluminescence by the excitation light emitted from the excitation light source. The lamp lens is a lens that transmits the photoluminescence generated in the luminescence unit and emits the photoluminescence outside the lamp chamber. As a result, the present invention enables effective use of the photoluminescence generated by the excitation light emitted from the excitation light source.

4 Claims, 18 Drawing Sheets

(56) References Cited

U.S. PATENT DOCUMENTS

| | | | |
|---|---|---|---|
| 9,581,756 B2* | 2/2017 | Boomgaarden | F21K 9/23 |
| 9,631,794 B2* | 4/2017 | Kamee | F21V 13/08 |
| 9,845,932 B2* | 12/2017 | Bauer | F21S 45/47 |
| 10,324,247 B2* | 6/2019 | Hikmet | G02B 6/0016 |
| 2004/0095779 A1 | 5/2004 | Schottland et al. | |
| 2008/0013335 A1 | 1/2008 | Tsutsumi | |
| 2009/0296018 A1* | 12/2009 | Harle | F21S 45/70 359/332 |
| 2018/0015887 A1 | 1/2018 | Salter et al. | |

FOREIGN PATENT DOCUMENTS

| | | |
|---|---|---|
| EP | 3 244 126 A1 | 11/2017 |
| EP | 3 355 664 A1 | 8/2018 |
| JP | 2008-21578 A | 1/2008 |
| JP | 2012-069908 A | 4/2012 |
| JP | 2013-131334 A | 7/2013 |
| JP | 2016-146356 A | 8/2016 |
| JP | 2016-181702 A | 10/2016 |
| JP | 2017-68923 A | 4/2017 |
| JP | 2018-538656 A | 12/2018 |
| KR | 10-2014-0078371 A | 6/2014 |
| WO | WO 2017/208334 A1 | 12/2017 |
| WO | WO 2019/073981 A1 | 4/2019 |
| WO | WO 2019/245030 A1 | 12/2019 |

OTHER PUBLICATIONS

Office Action issued Jul. 25, 2023, in corresponding Japanese Patent Application No. 2020-064053 (with English Translation), 13 pages.

Partial Supplementary European Search Report issued Sep. 26, 2023, in corresponding European Patent Application No. 21781741.0, 25 pages.

Office Action issued Feb. 27, 2024, in corresponding Japanese Patent Application No. 2020-064053 (with English Translation), 10 pages.

* cited by examiner

VEHICLE LAMP

TECHNICAL FIELD

The present invention relates to a vehicle lamp.

BACKGROUND ART

Examples of a vehicle lamp that uses photoluminescence generated by excitation light emitted from an excitation light source include, for example, a vehicle lamp disclosed in Patent Literature 1.

The vehicle lamp of Patent Literature 1 includes an excitation light source that emits excitation light, a luminescence layer that generates photoluminescence by the excitation light emitted from the excitation light source, a holding member that holds the luminescence layer, and a lens member that emits the photoluminescence.

The vehicle lamp of Patent Literature 1 provides surface luminescence by photoluminescence generated from the luminescence layer. Moreover, since the vehicle lamp of Patent Literature 1 uses the luminescence layer that does not require electrical energy as a surface light source, reliability of the surface light source is improved as compared to an organic light emitting diode that requires electrical energy as a surface light source.

CITATION LIST

Patent Literature

PTL 1: International Patent Publication No. 2019/245030

SUMMARY OF THE INVENTION

Problems to be Solved by the Invention

In such vehicle lamps, it is important to effectively utilize photoluminescence generated by the excitation light emitted from the excitation light source.

The problem to be solved by the present invention is to provide a vehicle lamp that can effectively utilize photoluminescence generated by excitation light emitted from an excitation light source.

Means for Solving the Problem

A vehicle lamp according to the present invention includes a lamp housing and a lamp lens forming a lamp chamber, an excitation light source disposed in the lamp chamber and emitting excitation light, and a luminescence unit fixed to the lamp lens on a side thereof closer to the lamp chamber and generating photoluminescence by the excitation light emitted from the excitation light source, and the lamp lens is a lens that transmits the photoluminescence generated in the luminescence unit and emits the photoluminescence outside the lamp chamber.

It is preferable that, in the vehicle lamp of the present invention, the luminescence unit includes a luminescence layer that generates the photoluminescence by the excitation light emitted from the excitation light source and a substrate on which the luminescence layer is formed and through which the excitation light is transmitted, the luminescence layer is fixed to the lamp lens by an adhesive so as to face the lamp lens via the adhesive, and the adhesive is a member through which at least the photoluminescence is transmitted.

It is preferable that, in the vehicle lamp of the present invention, the luminescence unit includes a luminescence layer that generates the photoluminescence by the excitation light emitted from the excitation light source, a substrate on which the luminescence layer is formed and through which the excitation light is transmitted, and a sealing member that seals the luminescence layer, and the luminescence layer is fixed to the lamp lens by an adhesive so as to face the lamp lens via the adhesive and the sealing member, and each of the adhesive and the sealing member is a member through which at least the photoluminescence is transmitted.

It is preferable that, in the vehicle lamp of the present invention, the sealing member includes a sealing substrate and a sealing adhesive that seals and bonds the sealing substrate to the luminescence layer.

It is preferable that, in the vehicle lamp of the present invention, a recess in which the luminescence unit is positioned and is fixed is provided in a position where the luminescence unit of the lamp lens is fixed.

It is preferable that, in the vehicle lamp of the present invention, the photoluminescence is red light, and the lamp lens is a lens that transmits the red light and absorbs other light than the red light.

It is preferable that, in the vehicle lamp of the present invention, an additional light source that emits red light is disposed in the lamp chamber.

A vehicle lamp according to the present invention includes a lamp housing and a lamp lens forming a lamp chamber, an excitation light source disposed in the lamp chamber and emitting excitation light, and a luminescence unit disposed in the lamp chamber, the luminescence unit includes a luminescence layer that generates photoluminescence by the excitation light emitted from the excitation light source, a substrate on which the luminescence layer is formed and through which the excitation light and the photoluminescence are transmitted, a first light emitting part provided on the substrate so as to face the lamp lens and emitting the photoluminescence that has been transmitted through the substrate directly outside the substrate from the luminescence layer, and a second light emitting part provided on the substrate so as to face the lamp lens and emitting the photoluminescence that is totally reflected in the substrate outside the substrate.

It is preferable that, the vehicle lamp of the present invention further includes a reflector, the excitation light source is disposed so as to face an end surface of the substrate located closer to the luminescence layer, and the reflector is disposed so as to face an end surface of the substrate located closer to the second light emitting part and has a reflective surface that reflects the photoluminescence that has been totally reflected in the substrate and has been emitted outside from the substrate toward the lamp lens.

It is preferable that, in the vehicle lamp of the present invention, the photoluminescence is red light, and the lamp lens is a lens that transmits the red light and absorbs other light than the red light.

It is preferable that, in the vehicle lamp of the present invention, a light shielding member is disposed between the lamp lens and the first light emitting part, the photoluminescence is a red light, and the lamp lens is a colorless lens.

A vehicle lamp according to the present invention includes a lamp housing and a lamp lens forming a lamp chamber, an excitation light source disposed in the lamp chamber and emitting excitation light, and a luminescence unit disposed in the lamp chamber, the luminescence unit includes a luminescence layer that generates photoluminescence by the excitation light emitted from the excitation light source, and a substrate on which the luminescence layer is formed and through which the excitation light is transmitted, and the luminescence layer is disposed so as to face the lamp lens, and the substrate has an incident surface that the excitation light emitted from the excitation light source enters and a reflective surface that reflects the excitation light that has entered from the incident surface toward the luminescence layer.

It is preferable that, in the vehicle lamp of the present invention, the incident surface is an incident surface that the excitation light emitted from the excitation light source enters as parallel incident excitation light, and the reflective surface is a reflective surface that reflects the parallel incident excitation light from the incident surface as parallel reflected excitation light.

It is preferable that, in the vehicle lamp of the present invention, a mounting part used for mounting the luminescence unit directly or indirectly on the lamp housing is provided on the substrate.

It is preferable that, in the vehicle lamp of the present invention, the photoluminescence is red light, and the lamp lens is a lens that transmits the red light and absorbs other light than the red light.

A vehicle lamp according to the present invention includes a lamp housing and a lamp lens forming a lamp chamber, and an excitation light source disposed in the lamp chamber and emitting excitation light, the lamp lens includes a lens material, and a phosphor material contained in the lens material and generating photoluminescence by the excitation light emitted from the excitation light source.

It is preferable that, in the vehicle lamp of the present invention, an optical member is disposed between the lamp lens and the excitation light source, and the optical member controls the excitation light emitted from the excitation light source and applies the excitation light to the lamp lens.

It is preferable that, in the vehicle lamp of the present invention, the phosphor material is an inorganic phosphor material.

It is preferable that, in the vehicle lamp of the present invention, the lens material is a resin material containing a red colorant, and the phosphor material is a red inorganic phosphor material.

It is preferable that, in the vehicle lamp of the present invention, the transmittance of the lamp lens is 1% or more and less than 100%.

It is preferable that, in the vehicle lamp of the present invention, a weight ratio of the phosphor material in the lamp lens is more than 0% and 50% or less.

It is preferable that, in the vehicle lamp of the present invention, a thickness of the lamp lens is more than 0 mm and 5 mm or less.

Effect of the Invention

A vehicle lamp according to the present invention can effectively utilize photoluminescence generated by excitation light emitted from an excitation light source.

BRIEF DESCRIPTION OF THE DRAWINGS

FIG. 9(A) is a view illustrating a substrate. FIG. 9(B) is a view illustrating a state where a luminescence layer is formed on the substrate.

FIG. 9(C) is a view illustrating a state before the substrate and the luminescence layer are adhesively sealed to a sealing substrate with a sealing adhesive. FIG. 9(D) is a view illustrating a state where the substrate and the luminescence layer are adhesively sealed to the sealing substrate with the sealing adhesive (view illustrating a state where the luminescence unit is produced).

FIG. 10(A) is a view illustrating a state where the luminescence unit is fixed in a recess provided in the lamp lens. FIG. 10(B) is a view illustrating a state where the sealing substrate of the luminescence unit is fixed to an inner surface of the lamp lens.

FIG. 13(A) is a view illustrating a substrate. FIG. 13(B) is a view illustrating a state where a luminescence layer is formed on the substrate. FIG. 13(C) is a view Illustrating a state before the substrate and the luminescence layer are adhesively sealed to a sealing substrate with a sealing adhesive. FIG. 13(D) is a view illustrating a state where the substrate and the luminescence layer are adhesively sealed to a sealing substrate with a sealing adhesive (view illustrating a state where the luminescence unit is produced).

MODE FOR CARRYING OUT THE INVENTION

Figure 1:
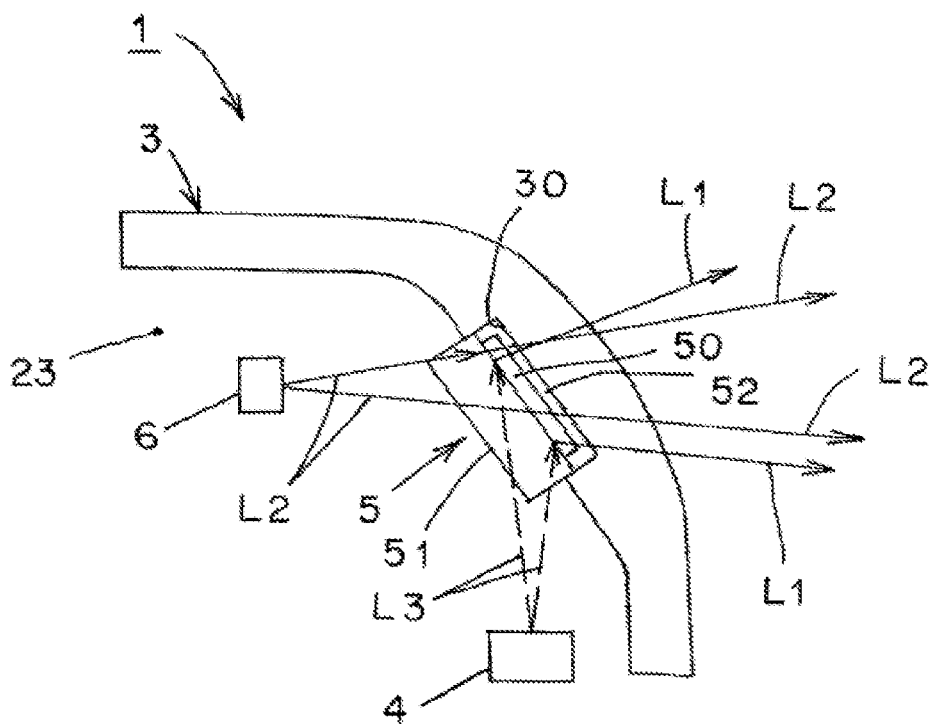
FIG. 1 is a longitudinal cross-sectional view of an excitation light source and an additional light source in a lighting state, illustrating a first embodiment of a vehicle lamp according to the present invention (cross-sectional view taken along a line I-I in FIG. 3).

Ten examples of embodiments (examples) of a vehicle lamp according to the present invention will be described in detail below with reference to the accompanying drawings. In this specification, front, rear, up, down, left, and right are front, rear, up, down, left, and right when a vehicle lamp according to the present invention is equipped on a vehicle. Since the drawings are schematic drawings, major components are illustrated and illustration of other components than the major components is omitted. In addition, some hatching of some components is omitted.

Description of Configuration of First Embodiment

FIG. 1 to FIG. 8 illustrate a first embodiment of a vehicle lamp according to the present invention. The following is a description of a configuration of the vehicle lamp of the first embodiment.
(Description of Vehicle Lamp 1)

In FIG. 1, FIG. 2, FIG. 3, FIG. 4, and FIG. 8, a reference sign 1 denotes the vehicle lamp of the first embodiment. The vehicle lamp 1 is, in this example, a tail stop lamp that constitutes a rear combination lamp. The vehicle lamp 1 may be a stop lamp or a tail lamp, in addition to a tail stop lamp. The vehicle lamp 1 is mounted on each of left and right sides of a rear portion of a vehicle (not illustrated).

The vehicle lamp 1 includes a lamp housing 2, a lamp lens 3, an excitation light source 4, a luminescence unit 5, and an additional light source 6.
(Description of Lamp Housing 2)

The lamp housing 2 (see a two-dot chain line in FIG. 8) is formed of, for example, a light non-transmitting material (such as a resin member or the like).
(Description of Lamp Lens 3)

The lamp lens 3 is, for example, a bare outer cover or an outer lens. The lamp lens 3 is, in this example, formed of a light-transmitting resin material, such as PMMA, PC, or the like.

Lamp lens 3 is mounted on the lamp housing 2. Thus, the lamp housing 2 and the lamp lens 3 form a lamp chamber 23.

A recess (counterbore) 30 is provided in a portion of an inner surface of the lamp lens 3 (surface facing the lamp chamber 23) where a luminescence unit 5 is fixed. The recess 30 is a tool used for positioning and fixing the luminescence unit 5 in a predetermined position in the lamp lens 3.

A preferred material for the lamp lens 3 is a material with a high transmittance in a visible light range. In this example, the lamp lens 3 forms red color. As a result, the lamp lens 3 transmits red light L1 and L2 (see solid arrows in FIG. 1 and FIG. 2) and absorbs other light than the red light L1 and L2. That is, the lamp lens 3 is a lens that transmits the photoluminescence L1 as the red light L1 generated in the luminescence unit 5 and emits the photoluminescence L1 outside the lamp chamber 23.
(Description of Excitation Light Source 4)

Figure 2:
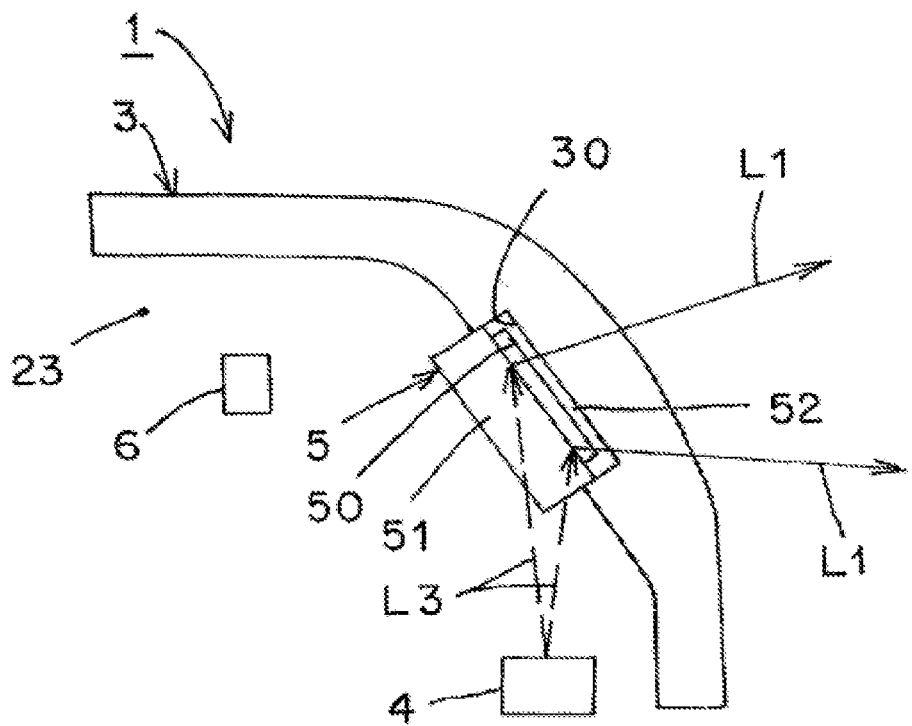
FIG. 2 is a longitudinal cross-sectional view illustrating the lighting state of the excitation light source (cross-sectional view taken along a line II-II in FIG. 4).
Figure 3:
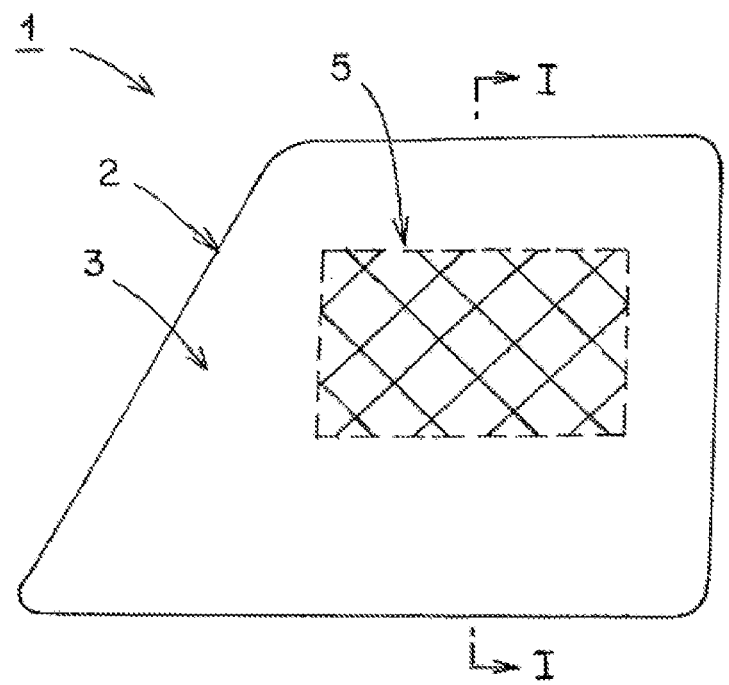
FIG. 3 is a front view illustrating respective lighting states of the excitation light source and the additional light source.
Figure 4:
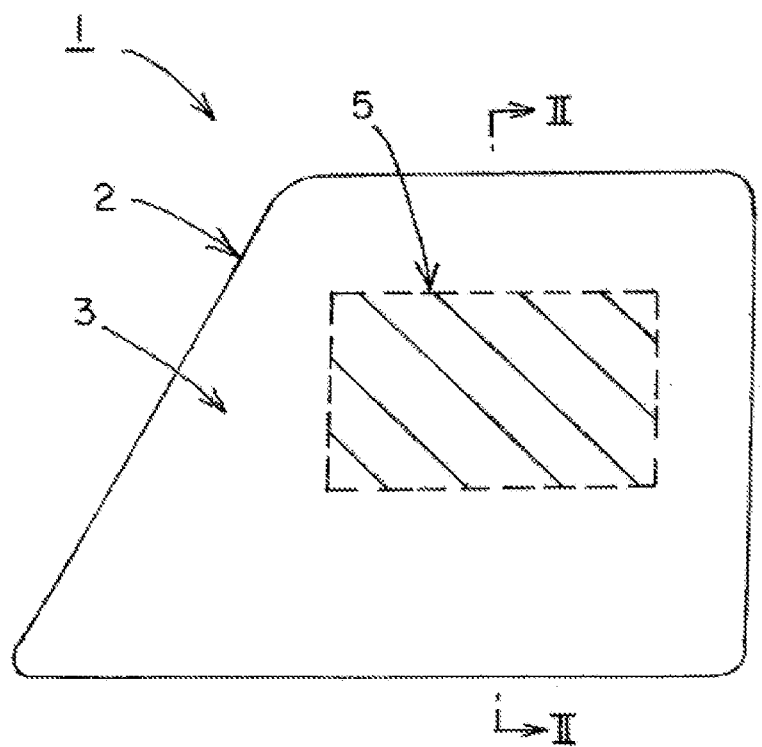
FIG. 4 is a front view illustrating the lighting state of the excitation light source.
Figure 5:
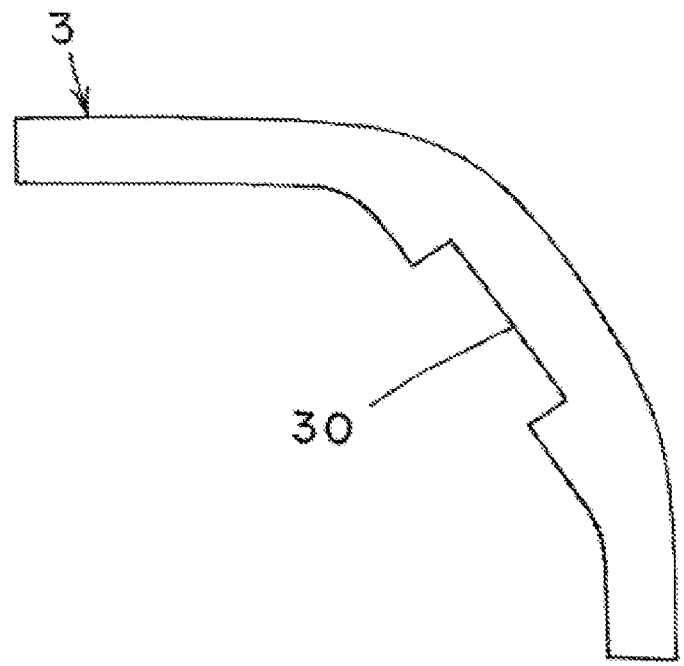
FIG. 5 is a view of a lamp lens.

In this example, the excitation light source 4 uses an LED, an LD (semiconductor laser), or the like to emit the excitation light L3 (see dashed arrows in FIG. 1 and FIG. 2). The excitation light L3 is light with a short wavelength, such as, for example, blue light, violet light, ultraviolet light, or the like.

Figure 8:
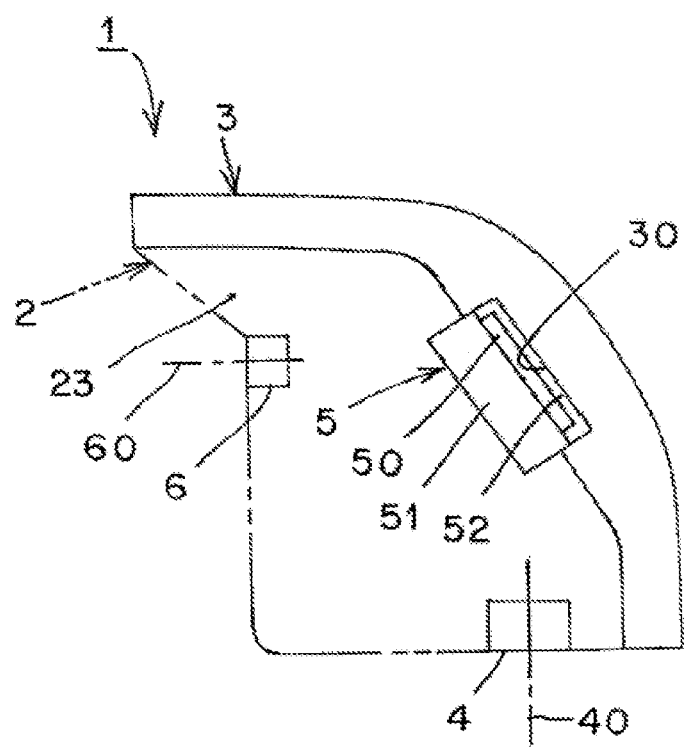
FIG. 8 is a view illustrating respective non-lighting states of the excitation light source and the additional light source.

The excitation light source 4 is mounted on the lamp housing 2 and is disposed in the lamp chamber 23, as illustrated in FIG. 8. In this example, an optical axis 40 of the excitation light source 4 is inclined at an angle of about 45° to a luminescence surface of the luminescence unit 5 (see a rectangle with a lattice pattern in FIG. 3 and a rectangle with a shaded pattern in FIG. 4). The optical axis 40 passes center of the luminescence surface of the excitation light source 4 and is perpendicular to the luminescence surface of the excitation light source 4. The excitation light source 4 is, in this example, a light source for tail stop lamps.
(Description of Luminescence Unit 5)

The luminescence unit 5 is fixed to the lamp lens 3 on a side thereof closer to the lamp chamber 23 and generates the photoluminescence L1 by the excitation light L3 emitted from the excitation light source 4. The luminescence unit 5 includes a luminescence layer 50 and a substrate (support substrate) 51.

The luminescence layer 50 is formed of an organic luminescence material (organic phosphor material), an inorganic luminescence material (inorganic phosphor material), or the like. The luminescence layer 50 generates the photoluminescence L1 by the excitation light L3 emitted from the excitation light source 4. The photoluminescence L1 is, in this example, red light L1 with a longer wavelength than that of the excitation light L3.

The luminescence layer 50 has a rectangular surface shape in this example. As a result, the vehicle lamp 1 provides rectangular surface luminescence (see a rectangle with the lattice pattern in FIG. 3 and the rectangle with the shaded pattern in FIG. 4) by the photoluminescence L1 generated in the luminescence layer 50 having a rectangular surface shape.

A substrate 51 transmits the excitation light L3 emitted from the excitation light source 4 and the red light L2 emitted from the additional light source 6. The substrate 51 is, in this example, formed of a light-transmitting resin material, such as PMMA, PC, or the like, light-transmitting glass, or the like. The substrate 51 can be flexible or rigid.

The substrate 51 has, in this example, a rectangular plate shape in a size one round larger than the luminescence layer

50. On one rectangular surface of the substrate 51, the luminescence layer 50 having a rectangular surface shape is formed (deposited).

The luminescence unit 5 is positioned and fixed in the recess 30 in the inner surface of the lamp lens 3 by an adhesive 52.

At this time, a luminescence layer 50 faces the lamp lens 3 via the adhesive 52. As a result, the luminescence layer 50 is fixed to the lamp lens 3 in a sealed state via the adhesive 52. That is, between the luminescence layer 50 and the lamp lens 3, there is the adhesive 52 whose refractive index is larger than a refractive index 1 of air, and air whose refractive index is 1 does not exist. Thus, the photoluminescence L1 generated in the luminescence layer 50 can enter the lamp lens 3 via the adhesive 52 without air therebetween.

The substrate 51 faces the excitation light source 4 and the additional light source 6 in the lamp chamber 23. One portion of the substrate 51 (a portion thereof on one plate surface side on which the luminescence layer 50 is formed) is fitted in the recess 30 of the lamp lens 3 and is adhered to the adhesive 52. The substrate 51 seals the luminescence layer 50 together with the adhesive 52.

The adhesive 52 transmits the photoluminescence L1 generated in the luminescence layer 50 and the red light L2 emitted from the additional light source 6. The adhesive 52 is, in this example, formed of silicone resin, epoxy resin, or the like. The refractive index of the adhesive 52 is preferably similar to that of the lamp lens 3.

(Description of Additional Light Source 6)

An additional light source 6 emits the red light L2. The additional light source 6 uses, in this example, an LED, an LD (semiconductor laser), or the like. The red light L2 emitted from the additional light source 6 is red light having a wavelength similar to that of the photoluminescence L1.

The additional light source 6 is mounted on the lamp housing 2 and is disposed in the lamp chamber 23. An optical axis 60 of the additional light source 6 is, in this example, about 45° inclined with respect to the luminescence surface of the luminescence unit 5. As a result, the optical axis 60 of the additional light source 6 and the optical axis 40 of the excitation light source 4 intersect each other at about 90°. The optical axis 60 passes the center of the luminescence surface of the additional light source 6 and is perpendicular to the luminescence surface of the additional light source 6. The additional light source 6 is, in this example, a light source for stop lamps.

(Description of Assembly Process of Vehicle Lamp 1)

An assembly process of the vehicle lamp 1 will be described below with reference to FIG. 5 to FIG. 8. First, the lamp housing 2 is molded. The lamp lens 3 with the recess 30 is molded (see FIG. 5). Furthermore, the luminescence unit 5 is produced.

Figure 6:
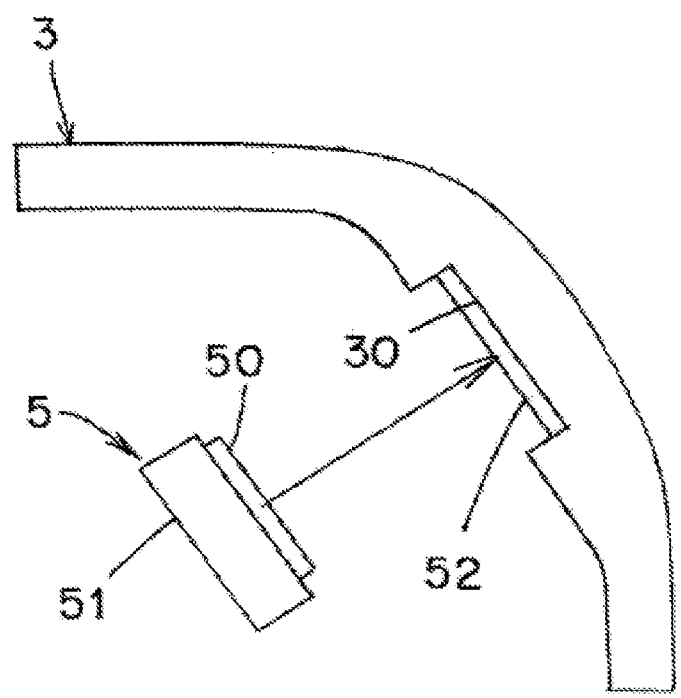
FIG. 6 is a view illustrating a state before a luminescence unit is fixed to the lamp lens.
Figure 7:
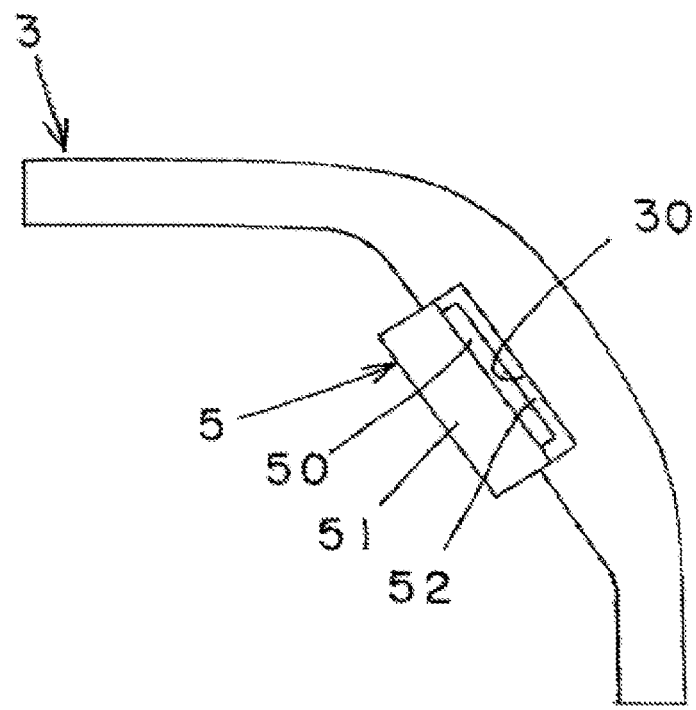
FIG. 7 is a view illustrating a state where the luminescence unit fixed to the lamp lens.

Next, the adhesive 52 is applied in the recess 30 of the lamp lens 3 and the luminescence unit 5 is fitted in the recess 30 with the luminescence layer 50 facing the lamp lens 3 (see FIG. 6). The lamp lens 3 and the luminescence unit 5 are bonded together using the adhesive 52 to produce an integrated structure of the lamp lens 3 and the luminescence unit 5 (see FIG. 7).

Thereafter, the lamp housing 2 and the lamp lens 3 are mounted to form the lamp chamber 23. The excitation light source 4 and the additional light source 6 are disposed in the lamp chamber 23. Thus, the vehicle lamp 1 is assembled (see FIG. 8).

Description of Operation of First Embodiment

The vehicle lamp 1 of the first embodiment has the configuration described above and an operation thereof will be described below.

First, the excitation light source 4 is turned on. Then, the excitation light L3 is emitted from the luminescence surface of the excitation light source 4 toward the luminescence unit 5 to form a Lambertian distribution. The excitation light L3 is transmitted through the substrate 51 of the luminescence unit 5 and is applied to the luminescence layer 50 of the luminescence unit 5.

The luminescence layer 50 generates the photoluminescence L1 by the excitation light L3. The photoluminescence L1 is transmitted through the adhesive 52 and the lamp lens 3 and is emitted outside the vehicle lamp 1 in a predetermined tail lamp light distribution pattern. At this time, the vehicle lamp 1 produces a rectangular surface luminescence with the shaded pattern in FIG. 4.

While the excitation light source 4 is on, the additional light source 6 is additionally turned on. Then, the red light L2 is additionally emitted from the luminescence surface of the additional light source 6 toward the luminescence unit 5 to form a Lambertian distribution.

The red light L2 is transmitted through the substrate 51 and the luminescence layer 50 of the luminescence unit 5, the adhesive 52, and the lamp lens 3 and is emitted outside the vehicle lamp 1 in a predetermined stop lamp light distribution pattern. At the same time, the above-described photoluminescence L1 is also transmitted through the adhesive 52 and the lamp lens 3 and is emitted outside the vehicle lamp 1 in a predetermined stop lamp light distribution pattern. At this time, the vehicle lamp 1 produces a rectangular surface luminescence with the lattice pattern in FIG. 3.

Description of Effects of First Embodiment

The vehicle lamp 1 of the first embodiment has the configuration and the operation described above, and effects thereof will be described below.

In the vehicle lamp 1 according to the first embodiment, the luminescence unit 5 is fixed to the lamp lens 3 on the side thereof closer to the lamp chamber 23, so that the photoluminescence L1 generated by the excitation light L3 emitted from the excitation light source 4 directly enters the lamp lens 3 without passing through the air (air layer). That is, when the photoluminescence L1 from the luminescence unit 5 enters the lamp lens 3 from the air (air layer), the photoluminescence L1 is not totally reflected at an incident surface of the lamp lens 3.

As a result, the vehicle lamp 1 according to the first embodiment can cause almost all of the photoluminescence L1 from the luminescence unit 5 to enter the lamp lens 3, and therefore, can effectively utilize the photoluminescence L1.

In the vehicle lamp 1 according to the first embodiment, the luminescence unit 5 is formed of the luminescence layer 50 and the substrate 51 and the luminescence layer 50 is fixed to the lamp lens 3 in a sealed state so as to face the lamp lens 3 via an adhesive 52. As a result, the vehicle lamp 1 according to the first embodiment can cause almost all of the photoluminescence L1 to enter the lamp lens 3 via the adhesive 52, and thus, can effectively utilize the photoluminescence L1.

Moreover, in the vehicle lamp 1 according to the first embodiment, the substrate 51 is formed of a member that transmits the excitation light L3 and the adhesive 52 is formed of a member that transmits the photoluminescence L1, and therefore, can effectively utilize the excitation light L3 and the photoluminescence L1.

The vehicle lamp 1 according to the first embodiment can accommodate all of the luminescence layer 50 of the luminescence unit 5 and a portion of the substrate 51 in the recess 30 of the lamp lens 3, and therefore, can cause all of the photoluminescence L1 generated in the luminescence layer 50 to enter the lamp lens 3 and can effectively utilize the photoluminescence L1.

The vehicle lamp 1 of the first embodiment can position and fix the luminescence unit 5 in the recess 30 of the lamp lens 3. As a result, in the vehicle lamp 1 of the first embodiment, accuracy of positioning the luminescence unit 5 is improved, the vehicle lamp 1 according to the first embodiment can control the photoluminescence L1 with high accuracy and can control the light distribution pattern (the tail lamp light distribution pattern and the stop lamp light distribution pattern) formed by emitting of the photoluminescence L1 with high accuracy.

In the vehicle lamp 1 of the first embodiment, the photoluminescence L1 is red light and the lamp lens 3 is a lens that transmits red light and absorbs other light than the red light. As a result, the vehicle lamp 1 of the first embodiment can effectively utilize the red light photoluminescence L1.

In the vehicle lamp 1 according to the first embodiment, the additional light source 6 that emits the red light L2 is disposed in the lamp chamber 23, and therefore, can effectively utilize both the red light photoluminescence L1 and the red light L2. Moreover, the vehicle lamp 1 according to the first embodiment has two lamp functions, that is, for example, a tail lamp function and a stop lamp function by the red light photoluminescence L1 and the red light L2.

Description of Configuration, Operation, and Effects of Second Embodiment

Figure 9:
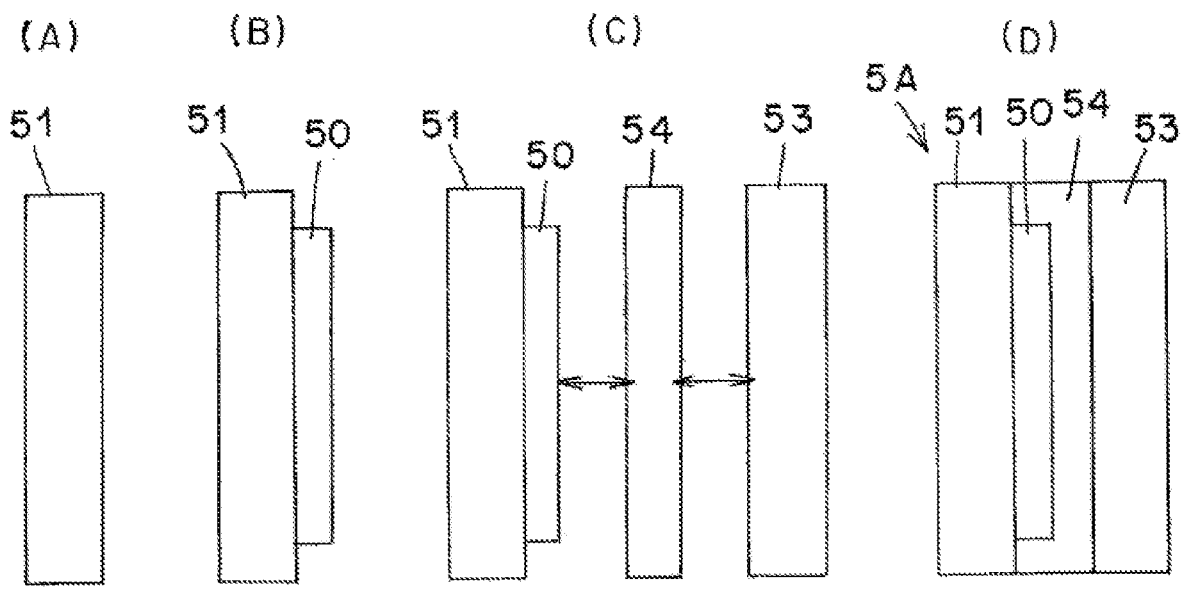
FIG. 9 is a view illustrating a production process of a luminescence unit, illustrating a second embodiment of the vehicle lamp of the present invention.
Figure 10:
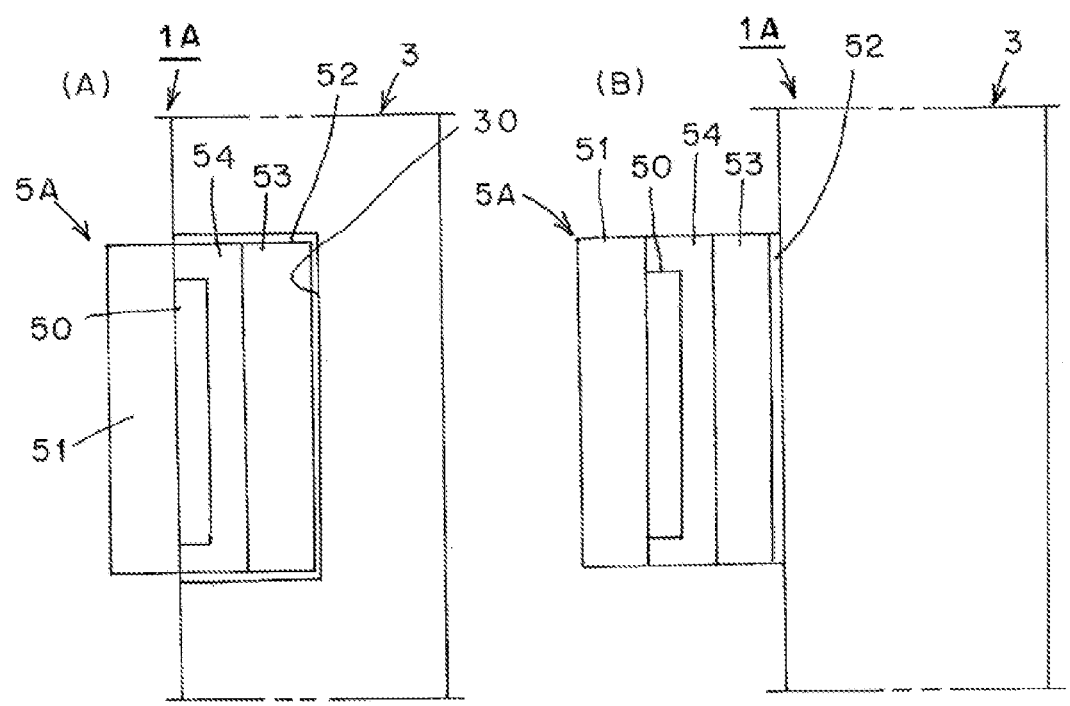
FIG. 10 is a view illustrating a state where the luminescence unit is fixed to the lamp lens.

FIG. 9 and FIG. 10 illustrate a second embodiment of the vehicle lamp of the present invention. A configuration, an operation, and effects of a vehicle lamp 1A according to the second embodiment will be described below. In FIG. 9 and FIG. 10, the same signs as those in FIG. 1 to FIG. 8 indicate the same items.

The vehicle lamp 1A of the second embodiment is a variant of the vehicle lamp 1 according to the first embodiment described above. Each of components of the vehicle lamp 1A of the second embodiment, such as a lamp housing (not illustrated), a lamp lens 3, an excitation light source (not illustrated), a luminescence layer 50, a substrate 51, an adhesive 52, an additional light source (not illustrated), or the like, has the same configuration as that of a corresponding one of components of the vehicle lamp 1 of the first embodiment described above, such as the lamp housing 2, the lamp lens 3, the excitation light source 4, the luminescence layer 50, the substrate 51, the adhesive 52, the additional light source 6, or the like.

The luminescence unit 5 of the vehicle lamp 1 of the first embodiment described above includes the luminescence layer 50 and the substrate 51. In contrast, a luminescence unit 5A of the vehicle lamp 1A of the second embodiment includes the luminescence layer 50, the substrate 51, and sealing members 53 and 54. The sealing members 53 and 54 include a sealing substrate 53 and a sealing adhesive 54 that seals and bonds the sealing substrate 53 to the luminescence layer 50.

The sealing substrate 53 transmits the photoluminescence L1 and the red light L2. Similar to the substrate 51, the sealing substrate 53 is, in this example, formed of a light-transmitting resin material, such as PMMA, PC, or the like, light-transmitting glass, or the like. The sealing substrate 53 can be flexible or rigid. The sealing substrate 53 has approximately the same size and shape as those of the substrate 51. A refractive index of the sealing substrate 53 is preferably the same as that of the lamp lens 3.

The sealing adhesive 54 transmits the photoluminescence L1 and the red light L2. Similar to the adhesive 52, the sealing adhesive 54 is, in this example, formed of silicone resin, epoxy resin, or the like. A refractive index of the sealing adhesive 54 is preferably the same as those of the sealing substrate 53 and the lamp lens 3.

(Description of Production Process for Luminescence Unit 5A)

A production process for the luminescence unit 5A will be described below with reference to FIG. 9. First, the substrate 51 is produced (see FIG. 9(A)). Next, the luminescence layer 50 is formed (deposited) on the substrate 51 (see FIG. 9(B)). Thus, the luminescence unit 5 of the vehicle lamp 1 of the first embodiment described above is produced.

The sealing substrate 53 is produced separately from production of the substrate 51. Thereafter, the luminescence layer 50 and the substrate 51 are bonded to the sealing substrate 53 with the sealing adhesive 54 (see FIG. 9(C)). The luminescence layers 50 is then sealed by the sealing members (the sealing substrate 53 and the sealing adhesive 54) (see FIG. 9 (D)).

Thus, the luminescence unit 5A of the vehicle lamp 1A of the second embodiment is produced. At this time, the luminescence layer 50 faces the sealing substrate 53 via the sealing adhesive 54. A portion of the substrate 51 (peripheral portions of the luminescence layer 50 located around four sides thereof) is bonded to the sealing adhesive 54.

The luminescence unit 5A produced by the production process described above is fixed to the lamp lens 3 on a side thereof closer to the lamp chamber 23 via the adhesive 52. For example, as illustrated in FIG. 10(A), the luminescence unit 5A is fixed in the recess 30 of the lamp lens 3 via the adhesive 52. Alternatively, as illustrated in FIG. 10(A), the luminescence unit 5A is fixed to a surface of the lamp lens 3 on the side thereof closer to the lamp chamber 23 via the adhesive 52. At this time, the sealing members (the sealing substrate 53 and the sealing adhesive 54) face the lamp lens 3.

The vehicle lamp 1A of the second embodiment has the configuration described above, and therefore, can achieve similar operation and effects to those of the vehicle lamp 1 of the first embodiment described above. Specifically, in the vehicle lamp 1A of the second embodiment, the luminescence layer 50 can be sealed and protected by the sealing members (the sealing substrate 53 and the sealing adhesive 54).

Description of Configuration of Third Embodiment

Figure 11:
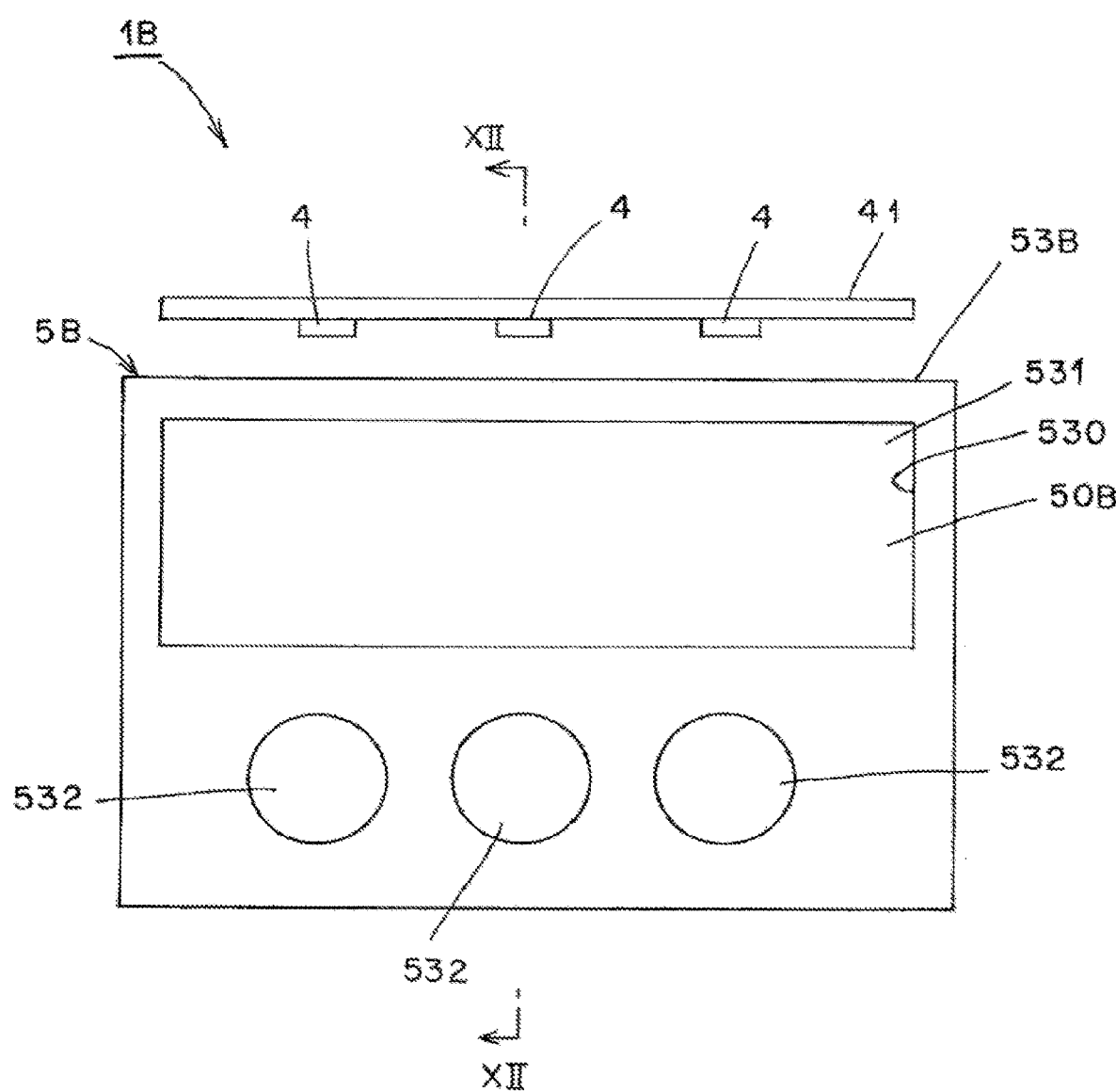
FIG. 11 is a front view of the excitation light source and the luminescence unit, illustrating a third embodiment of the vehicle lamp of the present invention (view in an arrow direction along an XI-XI line in FIG. 12).
Figure 12:
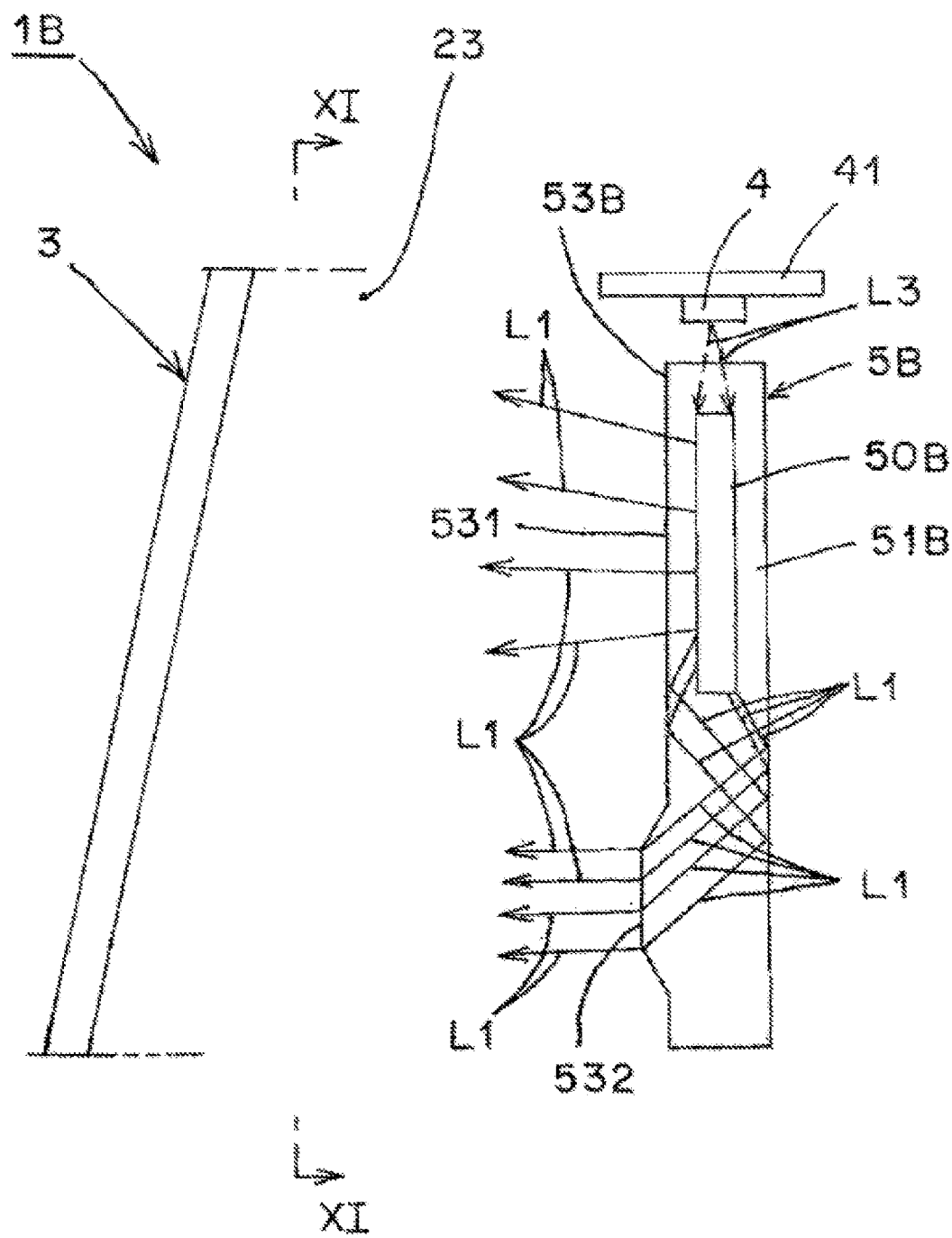
FIG. 12 is a longitudinal cross-sectional view illustrating the lamp lens, the excitation light source, and the luminescence unit (cross-sectional view taken along a line XII-XII in FIG. 11).
Figure 13:
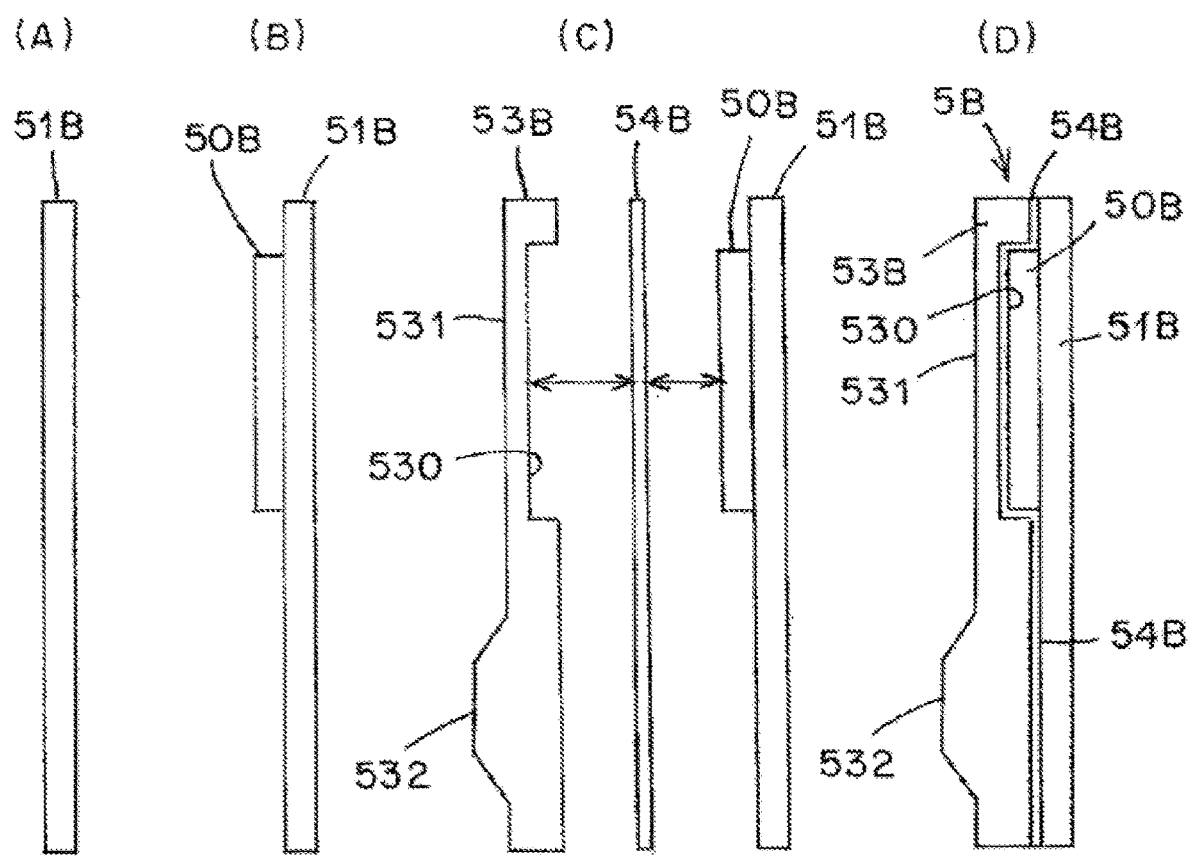
FIG. 13 is a view illustrating a production process of a luminescence unit.

FIG. 11 to FIG. 13 illustrate a third embodiment of the vehicle lamp of the present invention. A configuration of a vehicle lamp 1B according to the third embodiment will be described below. In FIG. 11 to FIG. 13, the same signs as those in FIG. 1 to FIG. 10 indicate the same items.

(Description of Vehicle Lamp 1B)

The vehicle lamp 1B of the third embodiment is almost the same as the vehicle lamps 1 and 1A of the first and second embodiments described above and includes a lamp housing (not illustrated), a lamp lens 3, an excitation light source 4, and a luminescence unit 5B.

In each of the vehicle lamps 1 and 1A of the first and second embodiments described above, a corresponding one of the luminescence units 5 and 5A is fixed to the lamp lens 3. In contrast, in the vehicle lamp 1B of the third embodiment, the luminescence unit 5B is not fixed to the lamp lens 3 but is disposed in the lamp chamber 23.

(Description of Excitation Light Source 4)

In this example, three excitation light sources 4 are mounted on a bottom surface of a mounting part 41 so as to be spaced at equal intervals. Luminescence surfaces of the excitation light sources 4 face downward. There is no particular limitation on the number of excitation light sources 4.

(Description of Luminescence Unit 5B)

A luminescence unit 5B is disposed under the excitation light sources 4. The luminescence unit 5B includes a luminescence layer 50B, a substrate 51B, a sealing substrate 53B, a sealing adhesive 54B, a first light emitting part 531, and a second light emitting part 532.

Components of the luminescence unit 5B of the third embodiment, that is, the luminescence layer 50B, the substrate 51B, the sealing substrate 53B, and the sealing adhesive 54B are made of the same materials as those used for components of the luminescence units 5 and 5A of the first and second embodiments described above, that is, the luminescence layer 50, the substrate 51, the sealing substrate 53, and the sealing adhesive 54.

The substrate 51B, the sealing substrate 53B, and the sealing adhesive 54B transmit the photoluminescence L1 from the luminescence layer 50B and the excitation light L3 from the excitation light sources 4. In addition, the substrate 51B and the sealing substrate 53B have a light guide function of guiding the photoluminescence L1 by a total reflection action.

The luminescence layer 50B has a rectangular surface shape that is long in a left-right direction in this example. In this example, each of the substrate 51B and the sealing substrate 53B has a rectangular plate shape in a size one round larger than that of the luminescence layer 50B and a dimension thereof in an up-down direction is twice as large as that of the luminescence layer 50B or more.

The luminescence layer 50B is formed (deposited) on an upper portion of one surface of the substrate 51B. A recess 530 is provided so as to correspond to the luminescence layer 50B in the upper portion of the one surface of the sealing substrate 53B (a surface facing the luminescence layer 50B and the substrate 51B).

The first light emitting part 531 is provided in an upper portion of the other surface of the sealing substrate 53B. The first light emitting part 531 and the recess 530 are provided in the both surfaces of the sealing substrate 53B so as to mutually correspond. As a result, similar to the luminescence layer 50B, the first light emitting part 531 has a rectangular surface shape that is long in the left-right direction. The first light emitting part 531 emits the photoluminescence L1 that has been transmitted through the sealing substrate 53B (substrate) outside the sealing substrate 53B (substrate).

A plurality of second light emitting parts 532, that is, three second light emitting parts 532 in this example, are provided in a lower portion of the other surface of the sealing substrate 53B. Each of the second light emitting parts 532 has a circular shape and protrudes from the other surface of the sealing substrate 53B. The second light emitting parts 532 emit the photoluminescence L1 that is totally reflected in the sealing substrate 53B (substrate) outside the sealing substrate 53B (substrate).

(Description of Production Process of Luminescence Unit 5B)

A production process for the luminescence unit 5B will be described below with reference to FIG. 13. First, the substrate 51B is produced (see FIG. 13(A)). Next, the luminescence layer 50B is formed (deposited) on the upper portion of the one surface of the substrate 51B (see FIG. 13(B)).

The sealing substrate 53B is produced separately from production of the substrate 51B. Thereafter, one surface of the luminescence layer 50B and one surface of the substrate 51B are bonded to one side of the sealing substrate 53B using the sealing adhesive 54 (see FIG. 13(C)). Then, the luminescence layer 50B is sealed by the substrate 51B, the sealing substrate 53B, and the sealing adhesive 54B (see FIG. 13(D)).

Thus, the luminescence unit 5B of the vehicle lamp 1B of the third embodiment is produced. At this time, the luminescence layer 50B faces the sealing substrate 53B via the sealing adhesive 54B. In addition, a portion of the substrate 51B other than the luminescence layer 50B is bonded to the sealing substrate 53B via the sealing adhesive 54B.

The luminescence unit 5B produced by the production process described above is disposed under the excitation light sources 4 in the lamp chamber 23 of the vehicle lamp 1B. The upper end surface of the luminescence unit 5B faces the luminescence surfaces of the excitation light sources 4. The first light emitting part 531 and the second light emitting part 532 of the luminescence unit 5B face the lamp lens 3. The excitation light sources 4 may be disposed on at least one of left and right end surfaces of the luminescence unit 5B. The excitation light sources 4 can be disposed so as to be inclined with respect to the luminescence unit 5B on a side closer to the lamp lens 3 or an opposite side to the lamp lens 3.

Description of Operation of Third Embodiment

The vehicle lamp 1B of the third embodiment has the configuration described above and an operation thereof will be described below.

First, the excitation light sources 4 are turned on. Then, the excitation light L3 is emitted from the luminescence surfaces of the excitation light sources 4 toward the luminescence unit 5B to form a Lambertian distribution. The excitation light L3 enters the substrate 51B, the sealing substrate 53B, and the sealing adhesive 54B from an upper end surface of the luminescence unit 5, is transmitted through the substrate 51B, the sealing substrate 53B, and the sealing adhesive 54B, and is applied to the luminescence layer 50B.

The luminescence layer 50B generates the photoluminescence L1 by the excitation light L3. A portion of the photoluminescence L1 is transmitted through the sealing adhesive 54B and the sealing substrate 53B and is emitted outside the sealing substrate 53B from the first light emitting part 531.

A large portion of the remaining photoluminescence L1 is totally reflected at the other surface of the substrate 51B and the other surface of the sealing substrate 53B, is transmitted through the substrate 51B, the sealing substrate 53B, and the sealing adhesive 54B, and is emitted outside the sealing substrate 53B from the second light emitting part 532.

The photoluminescence L1 emitted outside the sealing substrate 53B from the first light emitting part 531 and the second light emitting part 532 is transmitted through the lamp lens 3 and is emitted outside the vehicle lamp 1B with a predetermined tail lamp light distribution pattern or a predetermined stop lamp light distribution pattern.

At this time, the vehicle lamp 1B achieves surface luminescence having a rectangular shape that is long in the left-right direction in the first light emitting part 531 (see FIG. 11) and three surface luminescence each having a circular shape in the second light emitting part 532 (see FIG. 11).

Description of Effects of Third Embodiment

The vehicle lamp 1B of the third embodiment has the configuration and the operation described above, and effects thereof will be described below.

In the vehicle lamp 1B of the third embodiment, the first light emitting part 531 and the second light emitting parts 532 are provided on the sealing substrate 53B (substrate). As a result, the vehicle lamp 1B of the third embodiment can emit a portion of the photoluminescence L1 that has been transmitted through the sealing adhesive 54B and the sealing substrate 53B (substrate) directly from the luminescence layer 50B outside the sealing substrate 53B (substrate) from the first light emitting part 531. The vehicle lamp 1B of the third embodiment can transmit a large portion of the remaining photoluminescence L1, that is, the photoluminescence L1 that has not been emitted outside the sealing substrate 53B (substrate) from the first light emitting part 531, through the substrate 51B, the sealing substrate 53B, and the sealing adhesive 54B and emit the portion of the photoluminescence L1 outside the sealing substrate 53B (substrate) from the second light emitting part 532, while totally reflecting the portion of the photoluminescence L1 on the other surface of the substrate 51B and the other surface of the sealing substrate 53B. Thus, the vehicle lamp 1B of the third embodiment can more effectively utilize the photoluminescence L1.

Similar to the vehicle lamps 1 and 1A of the first and second embodiments, in the vehicle lamp 1B of the third embodiment, the photoluminescence L1 is red light and the lamp lens 3 is a lens (red lens) that transmits red light and absorbs other light than the red light. As a result, the vehicle lamp 1B of the third embodiment can effectively utilize the red light photoluminescence L1.

Description of Configuration, Operation, and Effects of Fourth Embodiment

Figure 14:
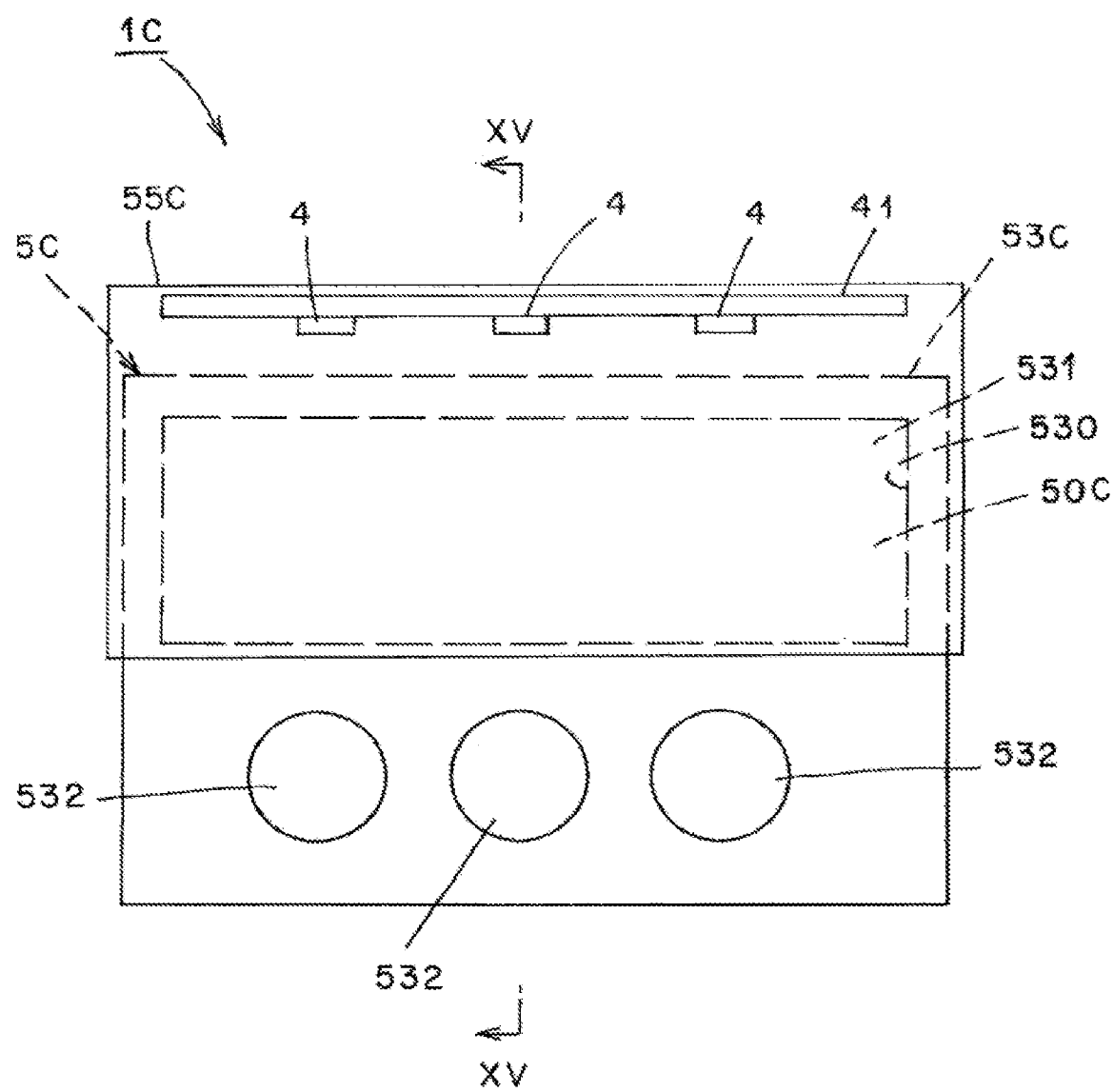
FIG. 14 is a front view of the excitation light source and the luminescence unit, illustrating a fourth embodiment of the vehicle lamp of the present invention (view in an arrow direction along an XIV-XIV line in FIG. 15).
Figure 15:
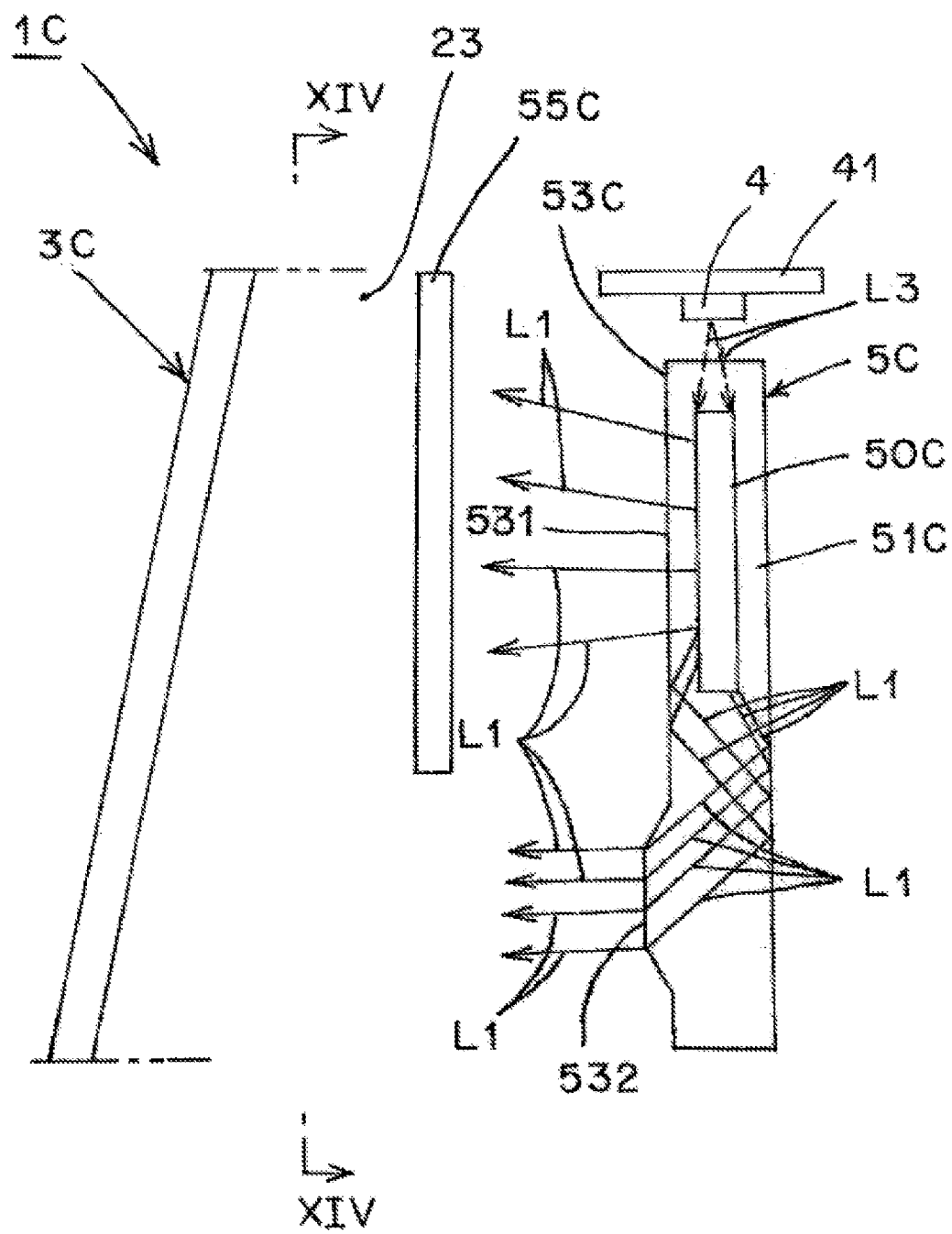
FIG. 15 is a longitudinal cross-sectional view illustrating the lamp lens, the excitation light source, and the luminescence unit (cross-sectional view taken along a line XV-XV in FIG. 16).

FIG. 14 and FIG. 15 illustrate a fourth embodiment of the vehicle lamp of the present invention. A configuration, an operation, and effects of a vehicle lamp 1C according to the fourth embodiment will be described below. In FIG. 14 and FIG. 15, the same signs as those in FIG. 1 to FIG. 13 indicate the same items.

The vehicle lamp 1C of the fourth embodiment is a variant of the vehicle lamp 1B of the third embodiment described above. Each of components of the vehicle lamp 1C of the fourth embodiment, such as, a lamp housing (not illustrated), an excitation light source 4, a luminescence unit 5C (a luminescence layer 50C, a substrate 51C, a sealing substrate 53C), or the like, has the same configuration as that of a corresponding one of components of the vehicle lamp 1B of the third embodiment described above, such as the lamp housing, the excitation light source 4, the luminescence unit 5B (the luminescence layer 50B, the substrate 51B, and the sealing substrate 53B), or the like.

The vehicle lamp 1B of the third embodiment described above uses a lens (red lens) that transmits red light and absorbs other light than the red light as the lamp lens 3. In contrast, the vehicle lamp 1C of the fourth embodiment uses a colorless transparent lens as the lamp lens 3C.

In the vehicle lamp 1C of the fourth embodiment, a light shielding member 55C is disposed between the lamp lens 3C and a first light emitting part 531 of the luminescence unit 5C. The light shielding member 55C shields light including the photoluminescence L1 that is red light.

The vehicle lamp 1C of the fourth embodiment has the configuration described above, and therefore, can achieve similar operation and effects to those of the vehicle lamp 1B of the third embodiment described above.

Specifically, the vehicle lamp 1C of the fourth embodiment uses a colorless transparent lens as the lamp lens 3C, and therefore, inside of the lamp chamber 23 can be seen from outside of the vehicle lamp 1C through the lamp lens 3C and a portion of a second light emitting part 532 of the luminescence unit 5C when light is not on. When light is on, three circles of surface luminescence of the second light emitting part 532 of luminescence unit 5C can be seen. As described above, the vehicle lamp 1C of the fourth embodiment can achieve a nearly transparent design when light is not on and also can achieve a luminescence surface having an arbitrary design when light is on.

Description of Configuration, Operation, and Effects of Fifth Embodiment

Figure 16:
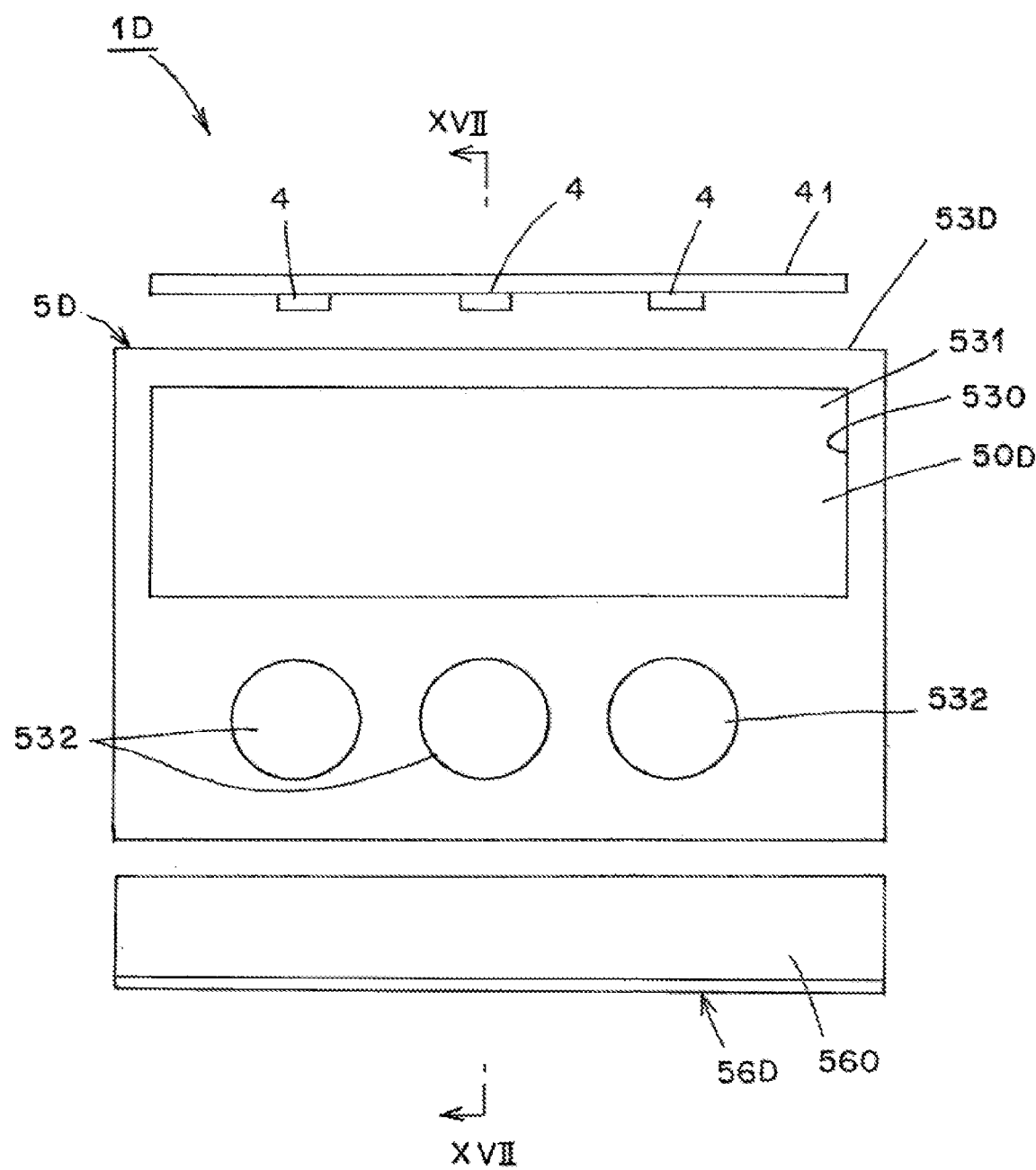
FIG. 16 is a front view of the excitation light source and the luminescence unit, illustrating a fifth embodiment of the vehicle lamp of the present invention (view in an arrow direction along an XVI-XVI line in FIG. 17).
Figure 17:
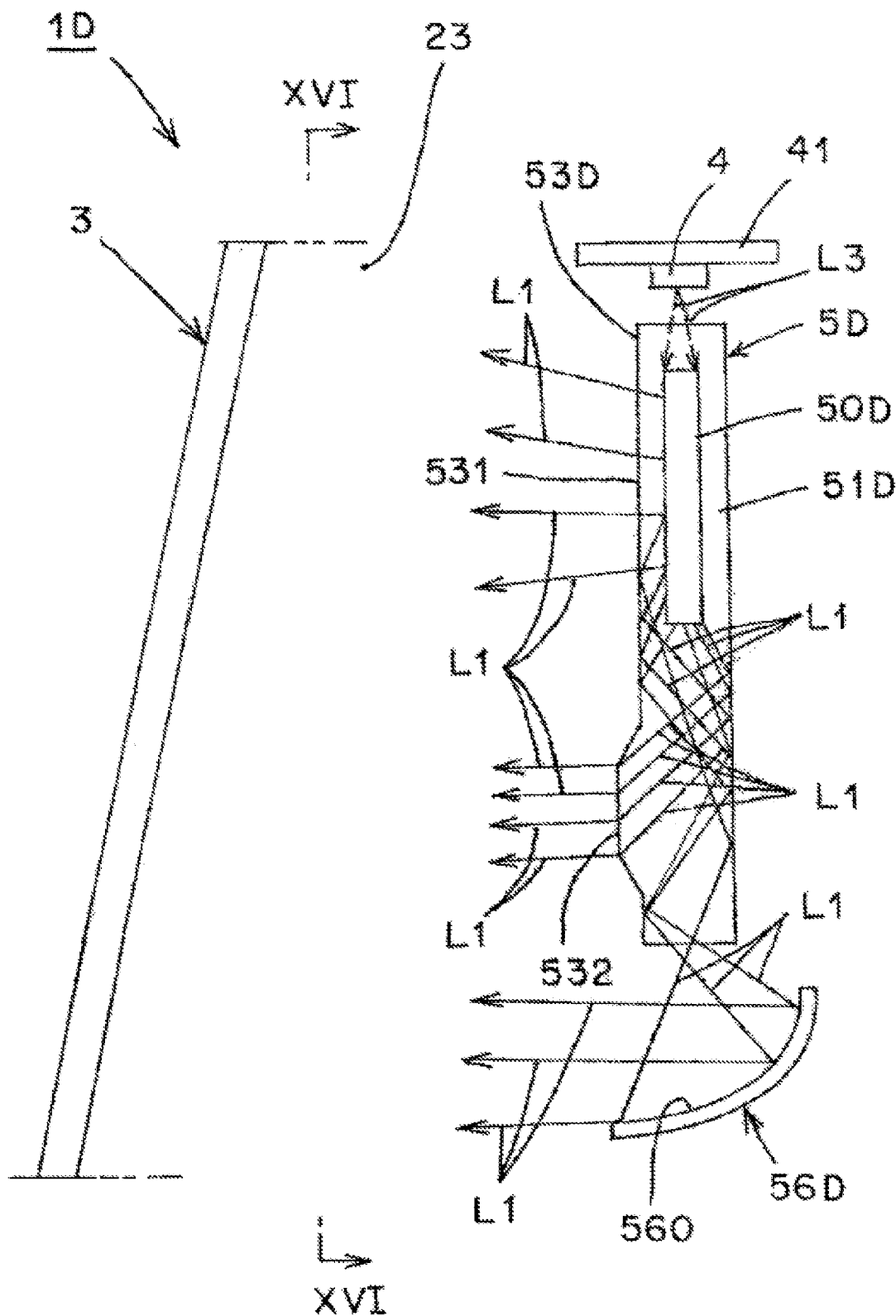
FIG. 17 is a longitudinal cross-sectional view illustrating the lamp lens, the excitation light source, and the luminescence unit (cross-sectional view taken along a line VVII-XVII in FIG. 16).

FIG. 16 and FIG. 17 illustrate a fifth embodiment of the vehicle lamp of the present invention. A configuration, an operation, and effects of a vehicle lamp 1D according to the fifth embodiment will be described below. In FIG. 16 and FIG. 17, the same signs as those in FIG. 1 to FIG. 15 indicate the same items.

The vehicle lamp 1D of the fifth embodiment is a variant of the vehicle lamp 1B of the third embodiment described above. Each of components of the vehicle lamp 1D of the fifth embodiment, such as, a lamp housing (not illustrated), a lamp lens 3, an excitation light source 4, a luminescence unit 5D (a luminescence layer 50D, a substrate 51D, a sealing substrate 53D), or the like, has the same configuration as that of a corresponding one of components of the vehicle lamp 1B of the third embodiment, such as the lamp housing, the lamp lens 3, the excitation light source 4, the luminescence unit 5B (the luminescence layer 50B, the substrate 51B, and the sealing substrate 53B), or the like.

The vehicle lamp 1D of the fifth embodiment includes a reflector 56D. The reflector 56D is disposed so as to face an end surface (lower end surface) of a portion of the substrate (that is, the substrate 51D and the sealing substrate 53D) of the luminescence unit 5D located closer to the second light emitting part 532.

In the vehicle lamp 1D according to this embodiment 5, similar to the vehicle lamps 1B and 1C of the third and fourth embodiments described above, a luminescence surface of the excitation light source 4 faces an end surface (upper end surface) of a portion of the substrate (that is, the substrate 51D and the sealing substrate 53D) of the luminescence unit 5D located closer to the first light emitting part 531.

In the vehicle lamp 1D of the fifth embodiment, the excitation light source 4 and the reflector 56D are vertically disposed with the luminescence unit 5D interposed therebetween.

A reflective surface 560 is provided in an inner surface of the reflector 56D. The reflective surface 560 faces each of the end surface of the substrate of the luminescence unit 5D located closer to the second light emitting part 532 and an inner surface of the lamp lens 3 (a surface of the lamp lens 3 located closer to the lamp chamber 23). As a result, the reflective surface 560 reflects the photoluminescence L1 that has been totally reflected in the substrate of the luminescence unit 5D and has been emitted to outside from the end surface of the substrate located closer to the second light emitting part 532 toward the lamp lens 3.

The vehicle lamp 1D of the fifth embodiment has the configuration described above, and therefore, can achieve similar operation and effects to those of the vehicle lamps 1B and 1C of the third and fourth embodiments described above.

Specifically, the vehicle lamp 1D of the fifth embodiment includes the reflector 56D having the reflective surface 560. As a result, the vehicle lamp 1D of the fifth embodiment can reflect the photoluminescence L1 that has been totally reflected in the substrate of the luminescence unit 5D and has been emitted outside from the end surface of the substrate located closer to the second light emitting part 532 toward the lamp lens 3 by the reflective surface 560 of the reflector 56D. Thus, the vehicle lamp 1D of the fifth embodiment can more effectively utilize the photoluminescence L1.

That is, the vehicle lamp 1D of the fifth embodiment emits the photoluminescence L1 that has been transmitted directly through the substrate from the luminescence layer 50B outside the substrate from the first light emitting part 531, transmits the photoluminescence L1 that has not been emitted outside the substrate from the first light emitting part 531 through the substrate while totally reflecting the photoluminescence L1 in the substrate to emit the photoluminescence L1 outside the substrate from the second light emitting part 532, and further transmits the photoluminescence L1 that has not been emitted outside the substrate from the second light emitting part 532 through the substrate while totally reflecting the photoluminescence L1 in the substrate to emit the photoluminescence L1 outside the substrate from the lower end surface of the substrate. As described above, the vehicle lamp 1D of the fifth embodiment can more effectively utilize the photoluminescence L1.

Description of Configuration, Operation, and Effects of Sixth Embodiment

Figure 18:
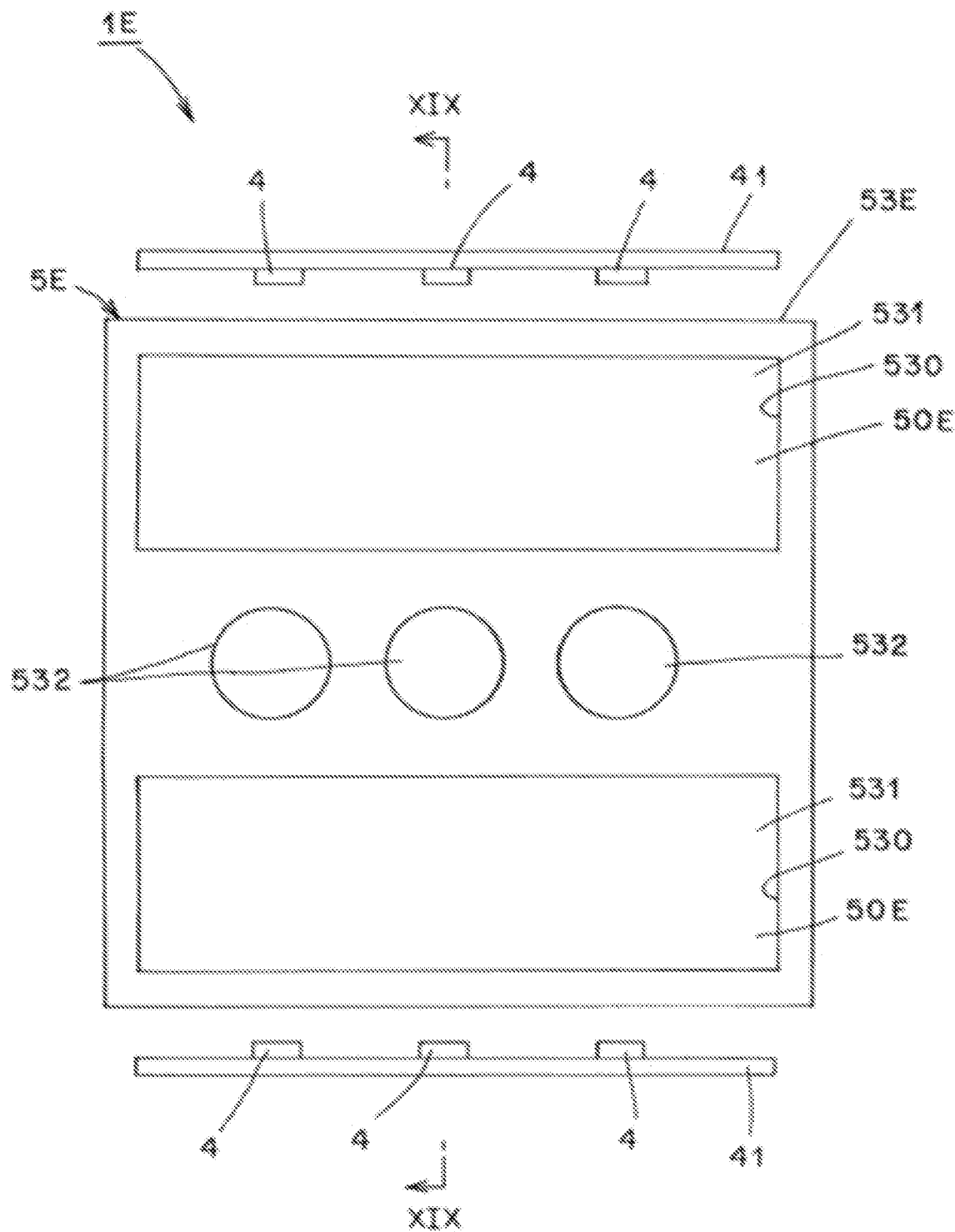
FIG. 18 is a front view of the excitation light source and the luminescence unit, illustrating a sixth embodiment of the vehicle lamp of the present invention (view in an arrow direction along an XVIII-XVIII line in FIG. 19).
Figure 19:
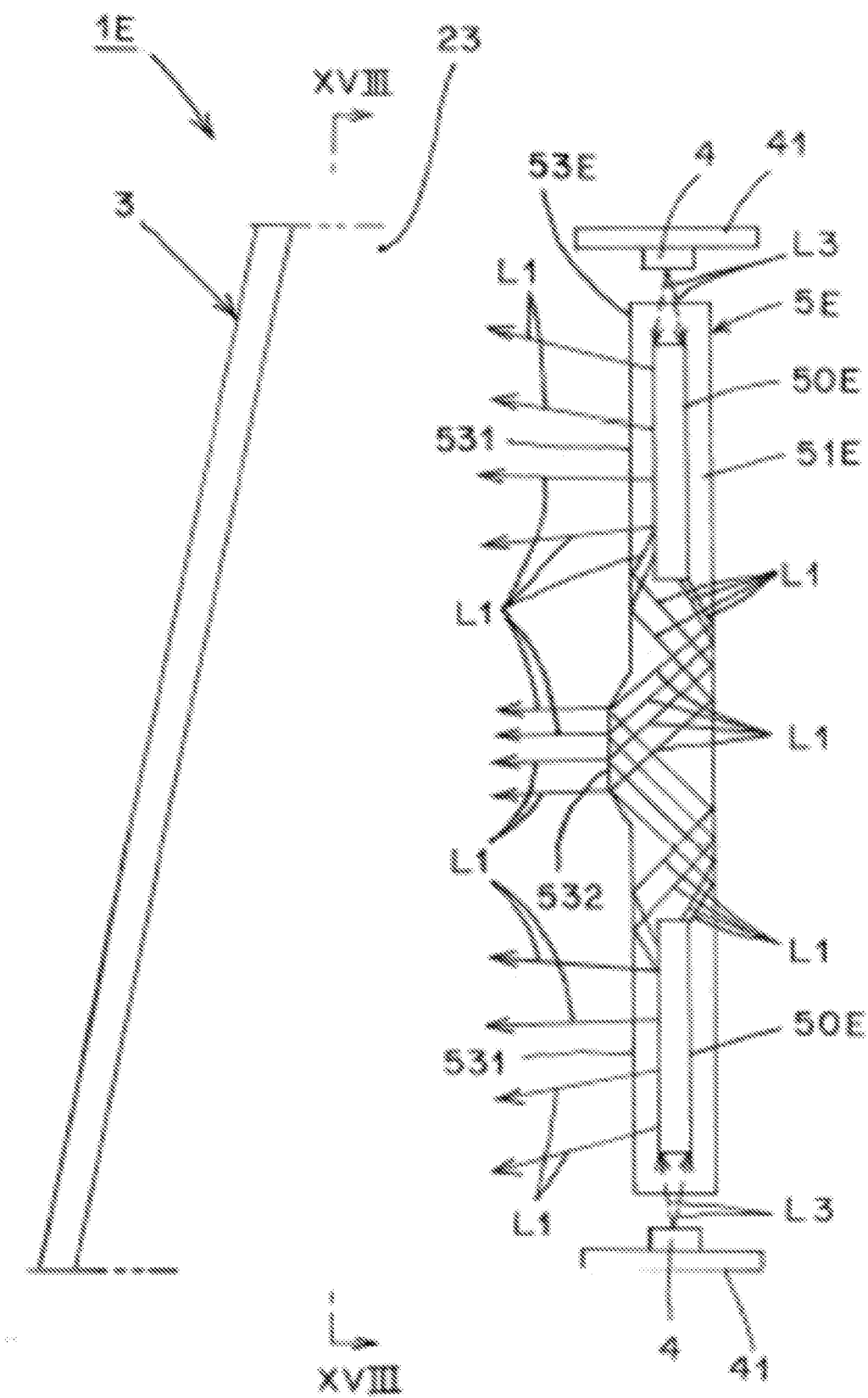
FIG. 19 is a longitudinal cross-sectional view illustrating a lamp lens, an excitation light source, and a luminescence unit (cross-sectional view taken along a line XIX-XIX in FIG. 18).

FIG. 18 and FIG. 19 illustrate a sixth embodiment of the vehicle lamp of the present invention. A configuration, an operation, and effects of a vehicle lamp 1E according to the sixth embodiment will be described below. In FIG. 18 and FIG. 19, the same signs as in FIG. 1 to FIG. 17 indicate the same items.

The vehicle lamp 1E of the sixth embodiment is a variant of the vehicle lamp 1B of the third embodiment described above. Each of components of the vehicle lamp 1E of the sixth embodiment, such as, a lamp housing (not illustrated), a lamp lens 3, an excitation light source 4, a luminescence unit 5E (a luminescence layer 50E, a substrate 51E, a sealing substrate 53E), or the like, has the same configuration as that of a corresponding one of components of the vehicle lamp 1B of the third embodiment described above, such as the lamp housing, the lamp lens 3, the excitation light source 4, the luminescence unit 5B (the luminescence layer 50B, the substrate 51B, and the sealing substrate 53B), or the like.

The vehicle lamp 1E of the sixth embodiment is vertically symmetrical with respect to a straight line connecting the three second light emitting parts 532 in the vehicle lamp 1B of the third embodiment described above. That is, the excitation light sources 4 are above and under the luminescence unit 5E, respectively. In the luminescence unit 5E, the luminescence layer 50E and the first light emitting part 531 are disposed vertically symmetrically with respect to the straight line connecting the three second light emitting parts 532.

The vehicle lamp 1E of the sixth embodiment has the configuration described above, and therefore, can achieve similar operation and effects to those of the vehicle lamp 1B of the third embodiment described above.

Specifically, in the vehicle lamp 1E of the sixth embodiment, the excitation light sources 4, the luminescence layer 50E, and the first light emitting part 531 are disposed vertically symmetrically with respect to the straight line connecting the three second light emitting parts 532. As a result, the vehicle lamp 1E of the sixth embodiment can achieve a luminescence surface having a large area.

Description of Configuration of Seventh Embodiment

Figure 20:
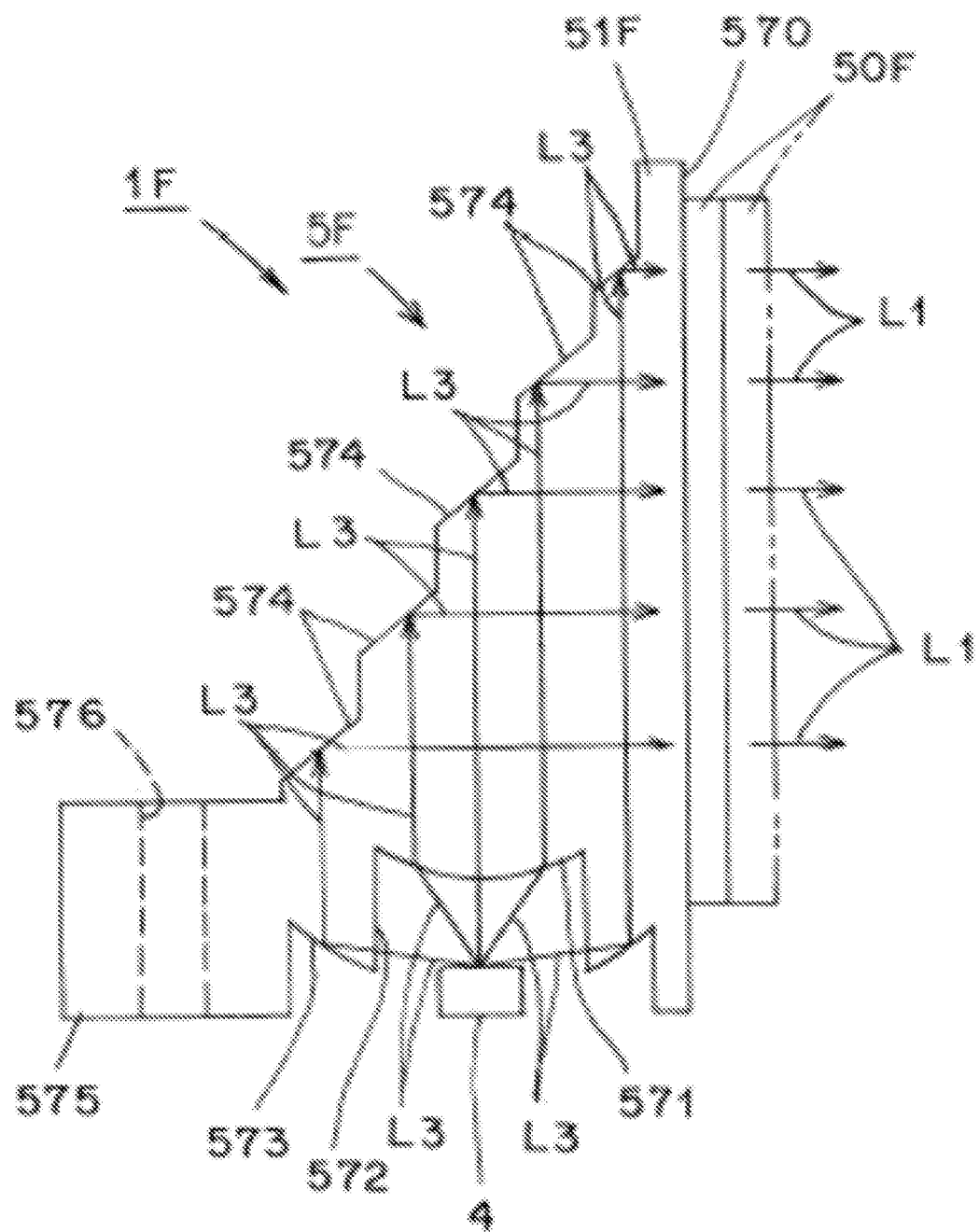
FIG. 20 is a longitudinal cross-sectional view of the excitation light source and the luminescence unit, illustrating a seventh embodiment of the vehicle lamp of the present invention.

FIG. 20 illustrates a seventh embodiment of the vehicle lamp of the present invention. A configuration of a vehicle lamp 1F according to the seventh embodiment will be described below. In FIG. 20, the same signs as those in FIG. 1 to FIG. 19 indicate the same items.

(Description of Vehicle Lamp 1F)

The vehicle lamp 1F of the seventh embodiment is almost the same as the vehicle lamps 1 and 1B of the first and third embodiments described above and includes a lamp housing (not illustrated), a lamp lens (not illustrated), an excitation light source 4, and a luminescence unit 5F.

Each of the vehicle lamps 1 and 1B of the first and third embodiments described above causes the excitation light L3 that has been emitted from a luminescence surface of the excitation light source 4 to form a Lambertian distribution to enter a corresponding one of the luminescence units 5 and 5B as it is and applies the excitation light L3 to the corresponding one of the luminescence layers 50 and 50B as it is. In contrast, the vehicle lamp 1F of the seventh embodiment causes the luminescence unit 5F to control the excitation light L3 from the excitation light source 4 to cause the excitation light L3 to enter there and causes a luminescence layer 50F to control the excitation light L3 to emit the excitation light L3.

(Description of Luminescence Unit 5F)

The luminescence unit 5F includes the luminescence layer 50F and a substrate 51F. Similar to the luminescence units 5A and 5B of the second and third embodiments described above, the luminescence unit 5F of the seventh embodiment may be configured such that the luminescence layer 50F is sealed by a sealing substrate (not illustrated) and a sealing adhesive (not illustrated).

Components of the luminescence unit 5F of the seventh embodiment, that is, the luminescence layer 50F and the substrate 51F are made of the same materials as those used for components of the luminescence units 5 and 5B of the first and third embodiments, that is, the luminescence layers 50 and 50B and the substrates 51 and 51B.

The luminescence layer 50F is disposed so as to face the lamp lens in a lamp chamber (not illustrated).

The substrate 51F includes a first incident surface 571, a second incident surface 572, a first reflective surface 573, a second reflective surface 574, and a light emitting surface 570.

The first incident surface 571 is a surface on which the excitation light L3 from the excitation light source 4 (the excitation light L3 whose solid angle including center of the luminescence surface of the excitation light source 4 serving as a point (a vertex of the angle) is about 70° to 80°) is refracted to enter the surface as parallel first incident light. The first incident light is parallel to an optical axis of the excitation light source 4 (which will be hereinafter referred to as an "optical axis"). The first incident surface 571 is provided so as to be opposed to the luminescence surface of the excitation light source 4. The first incident surface 571 is a refractive surface of a rotational hyperboloid generated by rotating a hyperbola including the center of the luminescence surface as a focal point around a main axis of the hyperbola (optical axis) as a rotation shaft.

The second incident surface 572 is a surface on which the excitation light L3 from the excitation light source 4 (the excitation light L3 whose solid angle including the center of the luminescence surface of the excitation light source 4 serving as a point (a vertex of the angle) is about 70° to 80° to about 180°) is refracted to enter the surface as second incident light. The second incident surface 572 is an outer periphery of the first incident surface 571 and is provided so as to be opposed to the luminescence surface of the excitation light source 4. The second incident surface 572 is a refractive surface of a rotating surface generated by rotating a straight line or a curved line around the optical axis as a rotation shaft.

The first reflective surface 573 is a surface that totally reflects the second incident light (a portion of incident light) from the second incident surface 572 as the first reflection light that is parallel to the optical axis. The first reflective surface 573 is a reflective surface of a paraboloid of revolution generated by rotating a parabola including the center of the luminescence surface of the excitation light source 4 as a focal point around the optical axis as a rotation shaft. Alternatively, the first reflective surface 573 is a reflective surface of a rotating surface generated by rotating a straight line following the parabola around the optical axis as a rotation shaft.

The second reflective surface 574 is a surface that totally reflects the first incident light (a portion of the incident light) that is parallel to the optical axis of light that has entered from the first incident surface 571 and the first reflective light that is parallel to the optical axis of light totally reflected by the first reflective surface 573, that is, the second incident light (a portion of the incident light) that has entered from the second incident surface 572, as the second reflective lights that are perpendicular to the optical axis and are mutually parallel. The second reflective surface 574 is a multi-stage, that is, in this example, five-stage, flat reflective surface.

The light emitting surface 570 is a flat surface that emits the second reflective lights reflected from the second reflective surface 547 as emission lights that are perpendicular to the optical axis and are mutually parallel. The luminescence layer 50F is formed (deposited) on the light emitting surface 570. As a result, emission light (the excitation light L3 from the excitation light source 4) emitted from the light emitting surface 570 is applied to the luminescence layer 50F. Thus, the luminescence layer 50F emits the photoluminescence L1.

A mounting part 575 is integrally provided in a portion of the substrate 51F in an opposite side to the light emitting surface 570. The mounting part 575 has a mounting hole 576. The mounting part 575 is mounted on the lamp housing by a screw or the like (not illustrated) passing through the mounting hole 576 directly or indirectly via a bracket or the like. As a result, the luminescence unit 5F is mounted on the lamp housing by the mounting part 575 of the substrate 51F directly or indirectly.

Description of Operation of Seventh Embodiment

The vehicle lamp 1F of the seventh embodiment has the configuration described above and an operation thereof will be described below.

First, the excitation light source 4 is turned on. Then, the excitation light L3 is emitted from the luminescence surface of the excitation light source 4 toward the first incident surface 571 and the second incident surface 572 of the luminescence unit 5F to form a Lambertian distribution.

A portion of the excitation light L3 enters the substrate 51F as the first incident light parallel to the optical axis from the first incident surface 571. A remaining portion of the excitation light L3 enters the substrate 51F from the second incident surface 572 as the second incident light and is reflected as the first reflection light that is parallel to the optical axis at the first reflective surface 573.

The first incident light that is parallel to the optical axis and the first reflection light are totally reflected as the second reflection lights that are perpendicular to the optical axis on the second reflective surface 574 and are mutually parallel. The second reflection lights are emitted from the light emitting surface 570 as emission lights and are applied to the luminescence layer 50F. Thus, the luminescence layer 50F emits the photoluminescence L1 toward the lamp lens. The photoluminescence L1 is transmitted through the lamp lens and is emitted outside the vehicle lamp 1F in a predetermined light distribution pattern.

Description of Effects of Seventh Embodiment

The vehicle lamp 1F of the seventh embodiment has the configuration described above and effects thereof will be described below.

In the vehicle lamp 1F of the seventh embodiment, the first incident surface 571, the second incident surface 572, the first reflective surface 573, the second reflective surface 574, and the light emitting surface 570 are provided on the substrate 51F of the luminescence unit 5F. As a result, the vehicle lamp 1F of the seventh embodiment can cause the luminescence unit 5F to control the excitation light L3 from the excitation light source 4 as parallel light (the parallel excitation light L3) to cause the excitation light L3 to enter there and also cause the luminescence layer 50F to control the excitation light L3 as parallel light (the parallel excitation light L3) to emit the excitation light L3. Thus, the vehicle lamp 1F of the seventh embodiment can control the photoluminescence L1 to emit the photoluminescence L1 from the luminescence layer 50F, and moreover, can effectively utilize the photoluminescence L1.

In the vehicle lamp 1F of the seventh embodiment, the mounting part 575 is provided on the substrate 51F, and therefore, the luminescence unit 5F can be mounted directly or indirectly on the lamp housing by mounting the mounting part 575 of the substrate 51F directly or indirectly on the lamp housing. As a result, the vehicle lamp 1F of the seventh embodiment can maintain a relative positional relationship between the lamp lens, the excitation light source 4, and the luminescence unit 5F with high accuracy, and therefore, can reliably cause the excitation light L3 from the excitation light source 4 to enter the luminescence unit 5F and can reliably emit the photoluminescence L1 from the luminescence unit 5F toward the lamp lens. Thus, the vehicle lamp 1F of the seventh embodiment can reliably control the photoluminescence L1 from the luminescence unit 5F, and moreover, can more effectively utilize the photoluminescence L1.

In the vehicle lamp 1F of the seventh embodiment, as illustrated in FIG. 20, if the luminescence layer 50F is formed to have a reduced thickness as indicated by the solid line, red color of the photoluminescence L1 becomes lighter, and if the luminescence layer 50F is formed to have an increased thickness as indicated by the double-dotted chain line, the red color of the photoluminescence L1 becomes darker. This is also true for the vehicle lamps 1 to 1E of the first to sixth embodiments described above and the shading of the red color of the photoluminescence L1 can be adjusted in the vehicle lamps 1 to 1E.

Similar to the vehicle lamps 1, 1A, 1B, 1D, and 1E of the first, second, third, fifth, and sixth embodiments described above, in the vehicle lamp 1F of the seventh embodiment, the photoluminescence L1 is red light and the lamp lens 3 is a lens (red lens) that transmits red light and absorbs other light than the red light. As a result, the vehicle lamp 1B of the third embodiment can effectively utilize the red light photoluminescence L1.

Description of Configuration of Eighth Embodiment

Figure 21:
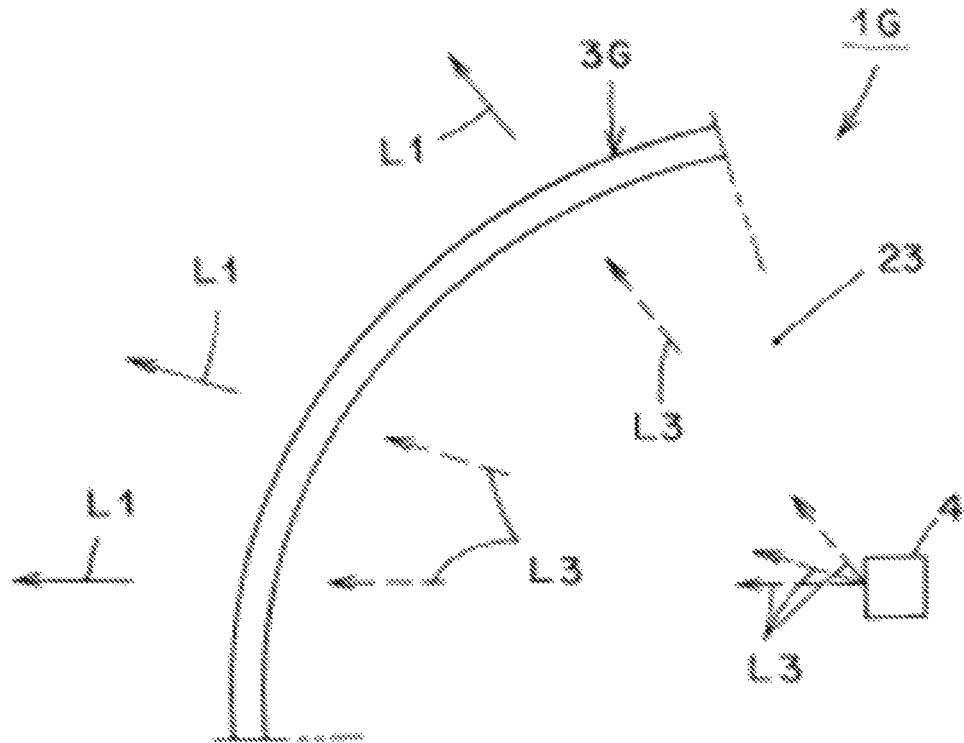
FIG. 21 is a longitudinal cross-sectional view of the lamp lens and the excitation light source, illustrating an eighth embodiment of the vehicle lamp of the present invention.
Figure 22:
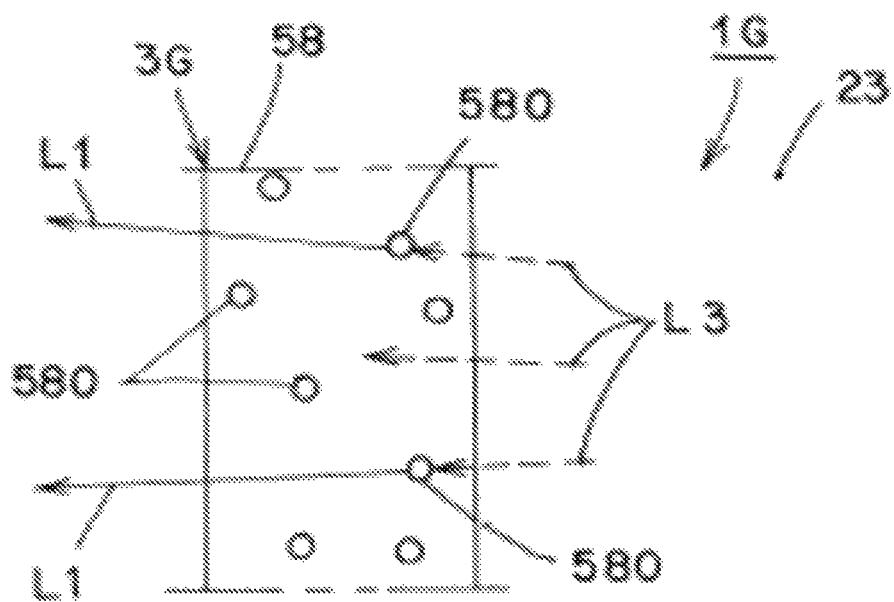
FIG. 22 is a partially enlarged longitudinal cross-sectional view of a portion of the lamp lens.

FIG. 21 and FIG. 22 illustrate an eighth embodiment of the vehicle lamp of the present invention. A configuration of a vehicle lamp 1G according to the embodiment 8 will be described below. In FIG. 21 and FIG. 22, the same sings as those in FIG. 1 to FIG. 20 indicate the same items.
(Description of Vehicle Lamp 1G)

Almost similar to the vehicle lamps 1 to 1F of the first to seventh embodiments described above, the vehicle lamp 1G of the eighth embodiment includes a lamp housing (not illustrated), a lamp lens 3G, and an excitation light source 4.

Each of the vehicle lamps 1 to 1F of the first to seventh embodiments described above includes a corresponding one of the luminescence units 5 to 5F each of which is provided separately from a corresponding one of the lamp lenses 3 and 3C. In contrast, the vehicle lamp 1G in the eighth embodiment causes the lamp lens 3G to also serve as a luminescence unit. As a result, the vehicle lamp 1G in the eighth embodiment does not include a luminescence unit.
(Description of Lamp Lens 3G)

The lamp lens 3G forms the lamp chamber 23 together with the lamp housing. An excitation light source 4 is disposed in a lamp chamber 23.

The lamp lens 3G has a lens material 58 and a phosphor material 580. The lens material 58 is an ordinary red lens of a resin material, such as, for example, PMMA or the like, containing a red colorant. The phosphor material 580 is a red inorganic phosphor material, that is, for example, CASN or the like. The lamp lens 3G is formed (molded) by mixing the lens material 58 and the phosphor material 580 during injection forming (injection molding).

The phosphor material 580 has a particle shape, is contained in the lens material 58, and generates the photoluminescence L1 by the excitation light L3 emitted from the excitation light source 4.

A transmittance of the lamp lens 3G is 1% or more and less than 100%. A weight ratio of the phosphor material 580 in the lamp lens 3G is more than 0% and 50% or less. Furthermore, a thickness of the lamp lens 3G is more than 0 mm and 5 mm or less. The transmittance of the lamp lens 3G, the weight ratio of the phosphor material 580 of the lamp lens 3G, and the thickness of the lamp lens 3G are not limited to the values in this example.

Description of Operation of Eighth Embodiment

The vehicle lamp 1G of the eighth embodiment has the configuration described above and an operation thereof will be described below.

The excitation light source 4 is turned on. Then, the excitation light L3 is emitted from a luminescence surface of the excitation light source 4 toward the lamp lens 3G. The excitation light L3 enters the lamp lens 3G from an inner surface of the lamp lens 3G (a surface thereof located closer to the lamp chamber 23). The excitation light L3 that has entered the lamp lens 3G is applied to the phosphor material 580 contained in the lens material 58.

The phosphor material 580 generates the photoluminescence L1 by the excitation light L3. The photoluminescence L1 is transmitted through the lens material 58 and emitted outside the vehicle lamp 1G from an outer surface of the lamp lens 3G (a surface thereof on an opposite side to the lamp chamber 23) in a predetermined light distribution pattern. Thus, the entire outer surface of the lamp lens 3G emits red light over.

Description of Effects of Eighth Embodiment

The vehicle lamp 1G of the eighth embodiment has the configuration described above and effects thereof will be described below.

In the vehicle lamp 1G of the eighth embodiment, the lamp lens 3G includes the lens material 58 and the phosphor material 580, and therefore, the entire lamp lens 3G emits light due to the photoluminescence L1 when the lamp lens 3G is irradiated with the excitation light L3 from the excitation light source 4. As a result, the vehicle lamp 1G of the eighth embodiment can efficiently utilize the photoluminescence L1.

Moreover, the vehicle lamp 1G of the eighth embodiment includes the lamp lens 3G, and thus, can emit the photoluminescence L1 without any one of the luminescence units 5 to 5F provided therein. As a result, for the vehicle lamp 1G of the eighth embodiment, the number of components can be reduced and production cost can be cut.

In the vehicle lamp 1G of the eighth embodiment, the phosphor material 580 of the lamp lens 3G is an inorganic phosphor material, so that the phosphor material 580 can be sufficiently resistant to temperature during injection forming of the lamp lens 3G.

In the vehicle lamp 1G of the eighth embodiment, the lens material 58 of the lamp lens 3G is an ordinary red lens of a resin material, such as, for example, PMMA or the like, containing a red colorant, and the phosphor material 580 of the lamp lens 3G is a red inorganic phosphor material, such as, for example, CASN or the like. As a result, the vehicle lamp 1G of the eighth embodiment can effectively utilize the red light photoluminescence L1.

In the vehicle lamp 1G of the eighth embodiment, the transmittance of the lamp lens 3G is 1% or more and less than 100%, so that the transmittance of the lamp lens 3G can be adjusted as desired and the degree of design freedom of the lamp lens 3G is increased.

In the vehicle lamp 1G of the eighth embodiment, the weight ratio of the phosphor material 580 in the lamp lens 3G is more than 0% and 50% or less, so that the weight ratio of the phosphor material 580 can be adjusted as desired, an amount of the photoluminescence L1 to be generated can be adjusted, and the degree of design freedom of the photoluminescence L1 is increased.

In the vehicle lamp 1G of the eighth embodiment, the lamp lens 3G has a thickness of more than 0 mm and 5 mm or less, so that the thickness of the lamp lens 3G can be adjusted as desired, the absorption of the excitation light L3 in the lamp lens 3G can be adjusted, and emitting of the excitation light L3 from the lamp lens 3G outside the vehicle lamp 1G can be controlled.

Description of Configuration, Operation, and Effects of Ninth Embodiment

Figure 23:
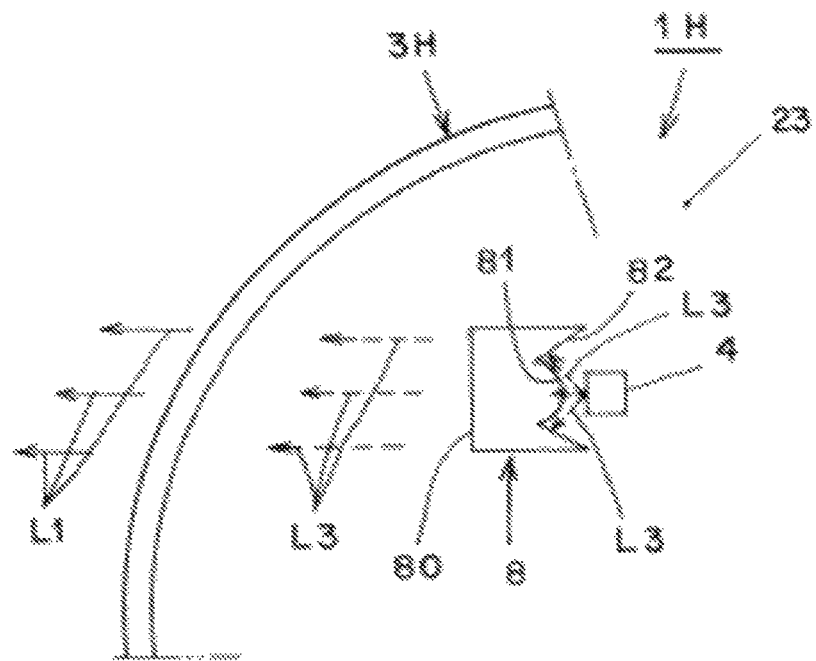
FIG. 23 is a longitudinal cross-sectional view of a lamp lens, an excitation light source, and an optical member, illustrating a ninth embodiment of the vehicle lamp of the present invention.

FIG. 23 illustrates a ninth embodiment of the vehicle lamp of the present invention. A configuration, an operation, and effects of a vehicle lamp 1H according to the ninth embodiment will be described below. In FIG. 23, the same signs as in FIG. 1 to FIG. 22 indicate the same items.

The vehicle lamp 1H of the ninth embodiment is a variant of the vehicle lamp 1G of the eighth embodiment described above. Each of components of the vehicle lamp 1H of the ninth embodiment, such as a lamp housing (not illustrated), a lamp lens 3H, an excitation light source 4, or the like, has the same configuration as that of a corresponding one of components of the vehicle lamp 1G of the eighth embodiment described above, such as the lamp housing, the lamp lens 3G, the excitation light source 4, or the like.

In the vehicle lamp 1H of the ninth embodiment, an optical member 8 is disposed between the lamp lens 3H and the excitation light source 4 in a lamp chamber 23. The optical member 8 controls the excitation light L3 emitted from the excitation light source 4 and applies the excitation light L3 to the lamp lens 3H.

The optical member 8 has a first incident surface 81, a second incident surface 82, and a light emitting surface 80. The first incident surface 81 causes a portion of the excitation light L3 from the excitation light source 4 to enter the optical member 8 as parallel light. The second incident surface 82 causes a remaining portion of the excitation light L3 from the excitation light source 4 to enter the optical member 8 as parallel light. Parallel incident light from the first incident surface 81 and parallel incident light from the second incident surface 82 are mutually parallel. The light emitting surface 80 emits the parallel incident light in the optical member 8 toward the lamp lens 3H as parallel light.

The vehicle lamp 1H of the ninth embodiment has the configuration described above, and therefore, can achieve similar operation and effects to those of the vehicle lamp 1G of the eighth embodiment described above.

Specifically, in the vehicle lamp 1H of the ninth embodiment, the optical member 8 is disposed between the lamp lens 3H and the excitation light source 4, so that the excitation light L3 emitted from the excitation light source 4 to form a Lambertian distribution can be controlled as parallel light via the optical member 8 and can be emitted toward the lamp lens 3H. As a result, the vehicle lamp 1H of the ninth embodiment can efficiently achieve the photoluminescence L1 as parallel light from the lamp lens 3H.

Description of Configuration, Operation, and Effects of Tenth Embodiment

Figure 24:
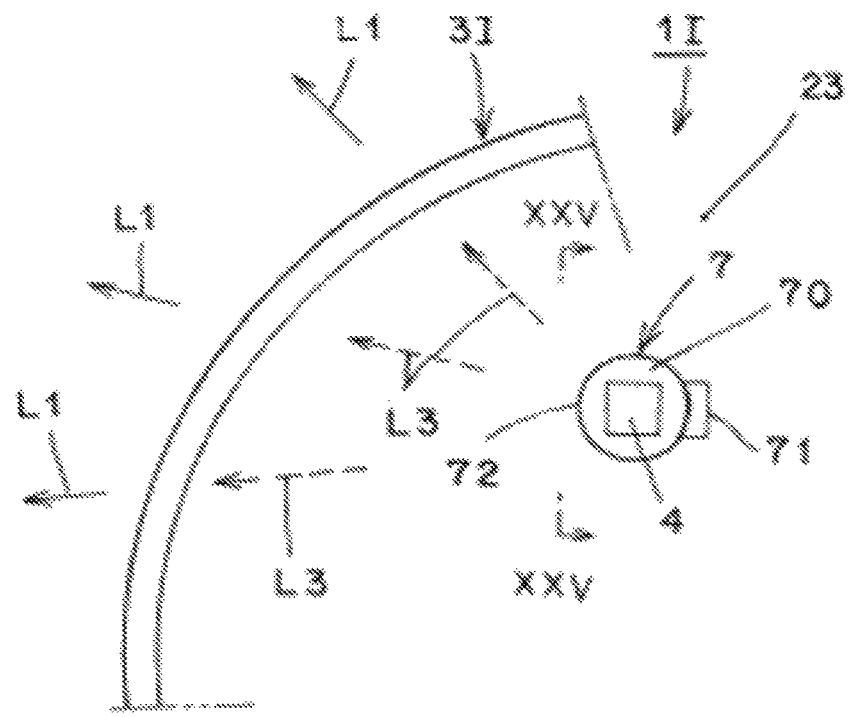
FIG. 24 is a longitudinal cross-sectional view of a lamp lens, an excitation light source, and an optical member, illustrating a tenth embodiment of the vehicle lamp of the present invention.
Figure 25:
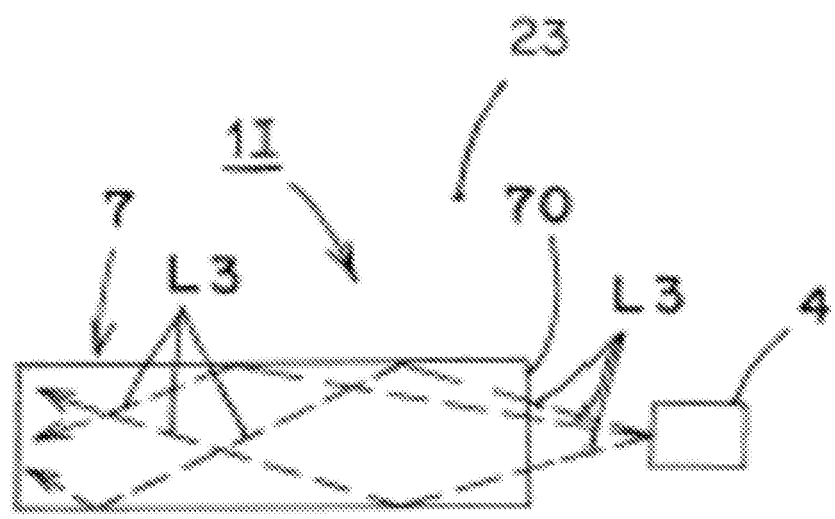
FIG. 25 is a front view illustrating the excitation light source and the optical member (view in an arrow direction along an XXV-XXV line in FIG. 24).

FIG. 24 and FIG. 25 illustrate a tenth embodiment of the vehicle lamp of the present invention. A configuration, an operation, and effects of a vehicle lamp 1I according to the tenth embodiment will be described below. In FIG. 24 and FIG. 25, the same signs as in FIG. 1 to FIG. 23 indicate the same items.

The vehicle lamp 1I of the tenth embodiment is a variant of the vehicle lamp 1G of the eighth embodiment described above. Each of components of the vehicle lamp 1I of the tenth embodiment, such as a lamp housing (not illustrated), a lamp lens 3I, an excitation light source 4, or the like, has the same configuration as that of a corresponding one of components of the vehicle lamp 1G of the eighth embodiment described above, such as the lamp housing, the lamp lens 3G, the excitation light source 4, or the like.

In the vehicle lamp 1I of the tenth embodiment, an optical member 7 is disposed between the lamp lens 3I and the excitation light source 4 in a lamp chamber 23. The optical member 7 controls the excitation light L3 emitted from the excitation light source 4 and applies the excitation light L3 to the lamp lens 3I.

The optical member 7 is a light guide member (light guide) having a round-bar shape. The optical member 7 has an incident surface 70 on one end surface, a reflective surface 71 on one side surface, and a light emitting surface 72 on the other side surface. The incident surface 70 causes the excitation light L3 from the excitation light source 4 to enter the optical member 7. The reflective surface 71 reflects the excitation light L 3 that has entered the optical member 7 and is guided from the incident surface at one end surface to the other end surface by the total reflection action in the optical member 7. Several reflective surfaces 71 are provided so that the reflective surfaces 71 and stepped surfaces are alternately provided. One reflective surface 71 and one stepped surface form one prismatic surface. The light emitting surface 72 emits the excitation light L3 in the optical member 8 reflected by the reflective surface 71 as diffused light toward the lamp lens 3I.

The vehicle lamp 1I of the tenth embodiment has the configuration described above, and therefore, can achieve similar operation and effects to those of the vehicle lamp 1G of the eighth embodiment described above.

Specifically, in the vehicle lamp 1I of the tenth embodiment, the optical member 7 is disposed between the lamp lens 3I and the excitation light source 4, and therefore, the excitation light L3 emitted from the excitation light source 4 to form a Lambertian distribution can be controlled as diffuse light via the optical member 7 and can be emitted toward the lamp lens 3I. As a result, the vehicle lamp 1I of the tenth embodiment can efficiently achieve the photoluminescence L1 as diffused light from the lamp lens 3I.

Description of Other Examples than First to Tenth Embodiments

In the first to tenth embodiments described above, one of a tail lamp, a stop lamp, or a tail stop lamp that constitutes a rear combination lamp has been described. However, the present invention can be also applied to other vehicle lamps than the lamps or displays described above. For example, the present invention can be applied to a turn signal lamp, a rear fog lamp, a backup lamp, or the like provided in a rear portion of a vehicle.

In each of the first to tenth embodiments described above, a rear combination lamp equipped in a rear portion of a vehicle has been described. However, the present invention can be also applied to a front combination lamp, an interior lamp, an instrument lamp, a decorative lamp, a display, or the like equipped in a front portion of a vehicle, in addition to a rear combination lamp equipped in a rear portion of the vehicle. Examples of the front combination lamp include a headlamp, a fog lamp, a day running lamp, a clearance lamp, a turn signal lamp, or the like.

Furthermore, in the first embodiment described above, the vehicle lamp 1 in which the recess 30 is provided in the lamp lens 3 on the side thereof closer to the lamp chamber 23 has been described. However, in the present invention, as illustrated in FIG. 10(B) of the second embodiment described above, a vehicle lamp in which the recess 30 is not provided in the lamp lens 3 on the side thereof closer to the lamp chamber 23 may be employed.

Furthermore, in the seventh embodiment described above, the first incident surface 571, the second incident surface 572, the first reflective surface 573, and the second reflective surface 574 are provided on the substrate 51F. In the present invention, however, there is no particular limitation on the incident surfaces and the reflective surfaces provided on the substrate.

Furthermore, in the seventh embodiment described above, the excitation light L3 and the photoluminescence L1 are controlled as parallel light. However, in the present invention, control of the excitation light L3 and the photoluminescence L1 is not limited to parallel light. For example, the excitation light L3 or the photoluminescence L1 may be controlled as diffused light or convergent (directional) light.

Furthermore, in the eighth embodiment described above, the transmittance of the lamp lens 3G is 1% or more and less than 100%, the weight ratio of the phosphor material 580 in the lamp lens 3G is more than 0% and 50% or less, and the thickness of the lamp lens 3G is more than 0 mm and 5 mm or less. However, in the present invention, the transmittance of the lamp lens 3G, the weight ratio of the phosphor material 580 in the lamp lens 3G, and the thickness of the lamp lens 3G are not limited to particular numerical values.

Furthermore, in the eighth embodiment described above, an ordinary red lens of a resin material, such as, for example, PMMA or the like, containing a red colorant, is used as the lens material 58, and a red inorganic phosphor material, such as for example, CASN or the like, is used as the phosphor material 580. However, in the present invention, there is no particular limitation on the lens material 58 and phosphor material 580.

Furthermore, in the eighth embodiment described above, as the phosphor material 580, an inorganic phosphor material is used, but an organic phosphor material may be also used.

The present invention is not limited by the first to tenth embodiments described above. For example, there is no particular limitation on a shape of surface luminescence. Surface luminescence of any design shape can be achieved. There is no particular limitation on a disposition state, the number, or the like of the excitation light sources 4 and the additional light sources 6 to be disposed.

DESCRIPTION OF REFERENCE NUMERALS 1, 1A, 1B, 1C, 1D, 1E, 1F, 1G, 1H, 1I Vehicle lamp
2 Lamp housing
23 Lamp chamber
3, 3C, 3G, 3H, 3I Lamp lens
30 Recess
4 Excitation light source
40 Optical axis
41 Mounting part
5, 5A, 5B, 5C, 5D, 5E, 5F Luminescence unit
50, 50B, 50C, 50D, 50E, 50F Luminescence layer
51, 51B, 51C, 51D, 51E, 51F Substrates
52 Adhesive
53, 53B, 53C, 53D, 53E Sealing substrate
530 Recess
531 First light emitting part
532 Second light emitting part
54, 54B Sealing adhesive
55C Light shielding member
56D Reflector
560 Reflective surface
570 Light emitting surface
571 First incident surface
572 Second incident surface
573 First reflective surface
574 Second reflective surface
575 Mounting part
576 Mounting hole
58 Lens material
580 Phosphor material
6 Additional light source
60 Optical axis
7 Optical member
70 incident surface
71 Reflective surface
72 Light emitting surface
8 Optical member
80 Light emitting surface
81 First incident surface
82 Second incident surface
L1 Photoluminescence (red light)
L2 Red light
L3 Excitation light

The invention claimed is:

1. A vehicle lamp comprising:
a lamp housing and a lamp lens forming a lamp chamber;
an excitation light source disposed in the lamp chamber and emitting excitation light; and
a luminescence unit fixed to the lamp lens on a side thereof closer to the lamp chamber and generating photoluminescence by the excitation light emitted from the excitation light source,
wherein the lamp lens is a lens that transmits the photoluminescence generated in the luminescence unit and emits the photoluminescence outside the lamp chamber, and a recess is provided in the lamp lens, and
wherein the luminescence unit includes a luminescence layer that generates the photoluminescence by the excitation light emitted from the excitation light source and a substrate on which the luminescence layer is formed and through which the excitation light is transmitted, and is fixed to the recess of the lamp lens by an adhesive so that the luminescence layer is accommodated in the recess and sealed by the substrate and the adhesive, the adhesive being a member through which at least the photoluminescence is transmitted so that the photoluminescence directly enters the lamp lens via the adhesive, and
wherein the luminescence unit further includes a sealing member that includes a sealing substrate and a sealing adhesive that seals and bonds the sealing substrate to the luminescence layer, and seals the luminescence layer so that the luminescence layer faces the lamp lens via the sealing member and the adhesive, the sealing member being a member through which at least the photoluminescence is transmitted, and the photoluminescence directly enters the lamp lens via the sealing member and the adhesive.

2. The vehicle lamp according to claim 1,
wherein
the photoluminescence is red light, and
the lamp lens is a lens that transmits the red light and absorbs other light than the red light.

3. The vehicle lamp according to claim 2,
wherein
an additional light source that emits red light is disposed in the lamp chamber.

4. The vehicle lamp according to claim 1,
wherein
the substrate has a shape in a size larger than the luminescence layer, is fitted in the recess, is adhered to the adhesive, and seals the luminescence layer together with the adhesive.

* * * * *